US009605614B2

(12) United States Patent
Miura et al.

(10) Patent No.: US 9,605,614 B2
(45) Date of Patent: Mar. 28, 2017

(54) VEHICLE CONTROL SYSTEM

(71) Applicant: Toyota Jidosha Kabushiki Kaisha, Toyota-shi (JP)

(72) Inventors: Mitsuhiro Miura, Toyota (JP); Shoichi Shono, Toyota (JP); Yoshikazu Motozono, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/651,899

(22) PCT Filed: Dec. 13, 2012

(86) PCT No.: PCT/JP2012/082296
§ 371 (c)(1),
(2) Date: Jun. 12, 2015

(87) PCT Pub. No.: WO2014/091591
PCT Pub. Date: Jun. 19, 2014

(65) Prior Publication Data
US 2015/0315991 A1 Nov. 5, 2015

(51) Int. Cl.
*F02D 41/12* (2006.01)
*F02D 41/04* (2006.01)
(Continued)

(52) U.S. Cl.
CPC ............. *F02D 41/04* (2013.01); *B60W 10/02* (2013.01); *B60W 10/04* (2013.01); *B60W 10/06* (2013.01);
(Continued)

(58) Field of Classification Search
USPC .......... 123/179.16, 179.19, 179.18, 198 DB; 701/36, 48, 532, 54, 104
See application file for complete search history.

(56) References Cited

U.S. PATENT DOCUMENTS

| 4,497,291 A * | 2/1985 | Hamano | ............. F02N 11/0818 |
| | | | 123/179.16 |
| 5,634,447 A * | 6/1997 | Rowells | .................. F01L 13/06 |
| | | | 123/322 |

(Continued)

FOREIGN PATENT DOCUMENTS

| JP | 2002-227885 A | 8/2002 |
| JP | 2012-31945 A | 2/2012 |
| WO | 2012/120688 A1 | 9/2012 |

OTHER PUBLICATIONS

International Search Report Issued Jan. 15, 2013 in PCT/JP12/082296 Filed Dec. 13, 2012.

*Primary Examiner* — Thomas Tarcza
*Assistant Examiner* — Richard Goldman
(74) *Attorney, Agent, or Firm* — Oblon, McClelland, Maier & Neustadt, L.L.P.

(57) ABSTRACT

The present disclosure relates to a vehicle control system for executing a fuel saving based on a learned value of fuel consumption obtained from an actual running of the vehicle. The control system makes an assessment of a fuel saving control by learning fuel consumption within a predetermined learning zone including a zone where the fuel saving control is executed and determines whether or not to execute the fuel saving control based on a result of the assessment.

9 Claims, 19 Drawing Sheets

(51) Int. Cl.

| | | |
|---|---|---|
| *B60W 30/18* | (2012.01) | |
| *B60W 10/02* | (2006.01) | |
| *B60W 10/04* | (2006.01) | |
| *B60W 10/06* | (2006.01) | |
| *F02D 41/08* | (2006.01) | |
| *F02D 29/02* | (2006.01) | |

(52) U.S. Cl.
CPC ....... *B60W 30/18018* (2013.01); *F02D 29/02* (2013.01); *F02D 41/08* (2013.01); *F02D 41/123* (2013.01); *F02D 2200/0625* (2013.01)

(56) References Cited

U.S. PATENT DOCUMENTS

| | | | | |
|---|---|---|---|---|
| 6,092,545 A | * | 7/2000 | Bedore | F16K 31/084 137/102 |
| 2008/0262712 A1 | * | 10/2008 | Duty | B60W 10/02 701/123 |
| 2009/0070021 A1 | * | 3/2009 | Leone | F02D 19/0684 701/113 |
| 2010/0010732 A1 | * | 1/2010 | Hartman | G01C 21/3484 701/532 |
| 2011/0056450 A1 | * | 3/2011 | Notani | F02N 11/0855 123/179.4 |
| 2011/0153127 A1 | * | 6/2011 | Weslati | B60W 50/085 701/22 |
| 2012/0078467 A1 | * | 3/2012 | Schweikl | B60K 26/021 701/36 |
| 2013/0131948 A1 | | 5/2013 | Iwao et al. | |
| 2013/0345952 A1 | | 12/2013 | Tsumori | |
| 2014/0244138 A1 | * | 8/2014 | Lewis | F02N 11/0803 701/105 |
| 2015/0073692 A1 | * | 3/2015 | Malikopoulos | B60W 50/14 701/123 |
| 2015/0167614 A1 | * | 6/2015 | Malone | F02N 11/0822 701/54 |
| 2015/0183433 A1 | * | 7/2015 | Suzuki | B60W 30/16 701/96 |
| 2015/0315991 A1 | * | 11/2015 | Miura | B60W 10/02 701/48 |

\* cited by examiner

| ID | Increment Flag of N Coasting | Increment Flag of Free-Run S&S | Increment Flag of Stop-Based S&S | Increment Flag of Deceleration-Based S&S |
|---|---|---|---|---|
| 1000 | 0 | 1 | 0 | 0 |
| 1001 | 1 | 0 | 0 | 0 |
| 1002 | 0 | 0 | 0 | 0 |
| . | . | . | . | . |
| . | . | . | . | . |
| . | . | . | . | . |

| ID | Effectiveness Flag of N Coasting or Free-Run S&S | Effectiveness Flag of Stop-Based S&S or Deceleration-Based S&S |
|---|---|---|
| 1000 | 2 | 0 |
| 1001 | 1 | 0 |
| 1002 | 0 | 0 |
| . | . | . |
| . | . | . |
| . | . | . |

VEHICLE CONTROL SYSTEM

The present invention relates generally to a system for controlling a driving condition of an automobile, and more particularly, to a vehicle control system configured to reduce fuel consumption of an engine.

BACKGROUND OF THE INVENTION

A running condition of a vehicle changes diversely from starting the vehicle to stopping the vehicle. For example, the vehicle is accelerated after starting, a vehicle speed is kept to a constant speed when cruising, and the vehicle is also accelerated when overtaking a forerunning vehicle. In addition, the vehicle is temporarily decelerated, is temporarily stopped, climbs an upgrade, runs down a down grade, is decelerated to be stopped etc. A required driving force is varied depending on those situations, and the driving force is not required during decelerating or stopping the vehicle. According to the conventional art, however, an engine speed has to be kept to an idling speed to be maintained in a self-sustaining condition even when the driving force is not required.

The engine is used not only to generate a driving force but also to drive an alternator to generate electricity, to drive an oil pump to generate hydraulic pressure, and to drive an air conditioner compressor. Therefore, the electric power, the hydraulic pressure and air conditioning are ensured by operating the engine even during stopping or decelerating the vehicle. However, a required amount of fuel to maintain the engine speed to the self-sustaining speed is larger than a required amount of the fuel to ensure electric generation and air conditioning. In order to reduce fuel consumption according to the prior art, a fuel cut-off control is carried out to temporarily stop fuel supply to the engine during decelerating the vehicle until the rotational speed of the engine is lowered to a lowest speed possible to be reactivated by supplying the fuel thereto. For example, Japanese Patent Laid-Open No. 2002-227885 describes a clutch control device configured to allow the vehicle to coast. According to the teachings of Japanese Patent Laid-Open No. 2002-227885, in order to lighten a load to rotate the engine passively and to interrupt power transmission between the engine and drive wheels, a clutch is brought into disengagement upon satisfaction of a predetermined condition to disconnect the engine from a transmission.

Other kinds of fuel saving controls are also available in the conventional arts to reduce fuel consumption of the vehicle. To this end, specifically, necessity to activate the engine is determined based on an opening degree of an accelerator, an operating condition of a brake, a vehicle speed etc. According to those kinds of fuel saving controls, fuel supply to the engine is stopped or reduced while disconnecting the engine from a powertrain if the engine is not required to be operated. Consequently, an amount of the fuel consumed by the engine can be reduced during running.

However, during execution of the fuel cut-off control, the engine is rotated passively by an inertia force and hence the inertial energy is frictionally consumed as an engine braking force. In this situation, if the vehicle is intended to be stopped, such inertial energy can be utilized to decelerate the vehicle. By contrast, such inertial energy would be consumed wastefully if the vehicle will be driven at a constant speed or accelerated after decelerated. In turn, during execution of the coasting control, a clutch is disengaged to disconnect the engine from the powertrain so that the inertial energy will not be consumed wastefully to apply the engine braking force. During the coasting, however, the fuel is consumed to keep the engine at a self-sustaining speed. In this case, therefore, the fuel will be consumed to unnecessarily activate the engine during deceleration of the vehicle to stop. If the engine is stopped during coasting, fuel consumption can be reduced. However, if the vehicle is intended to be accelerated or propelled at a constant speed after being decelerated, the engine will have to be started and hence the fuel will be consumed. That is, if the fuel consumption could not be reduced during coasting, a fuel consumption to restart the engine may exceed the fuel reduction.

Thus, fuel consumption can be reduced during execution of the energy saving controls such as the fuel cut-off control and the coasting control. However, fuel consumption may be increased by the fuel cut-off control or the coasting control, or otherwise, other kinds of energy saving control would be more appropriate to save the fuel depending on an expected running condition within a subsequent traveling zone. According to the conventional arts, those kinds of energy saving controls are executed based on an operating condition of the vehicle, and hence the energy saving control selected during running may not necessarily be the most appropriate control to save the fuel depending on a running environment of the vehicle. Therefore, the energy saving control has to be improved to save the fuel in accordance with the running environment of the vehicle.

BRIEF SUMMARY OF THE INVENTION

The present invention has been conceived noting the foregoing technical problems, and it is therefore an object of the present invention is to provide a vehicle control system configured to improve fuel economy of the vehicle by optimally selecting a fuel saving control in accordance with a road gradient and a road traffic conditions.

The vehicle control system of the present invention is configured to execute a fuel saving control by stopping fuel supply to an engine upon satisfaction of a predetermined condition. In order to achieve the above-explained object, according to the present invention, the control system is further configured to: make an assessment of the fuel saving control by learning a fuel consumption value within a predetermined learning zone including a zone where the fuel saving control is executed; and inhibit the fuel saving control or execute another fuel saving control in the learning zone when the vehicle travels through the learning zone, if the assessment shows that the fuel saving control executed in the learning zone was not effective to save fuel.

Specifically, the above-mentioned learned fuel consumption value includes the fuel consumption in the learning zone.

The vehicle control system is further configured to save the learned fuel consumption value while associating it with the learning zone.

The learning zone is set to include a zone where a curvature is smaller than a predetermined value and a length is longer than a predetermined distance.

For example, an internal combustion engine adapted to increase an output power according to an opening degree of an accelerator may be used as the engine. In addition, the learning zone is set to begin from a point at which an opening degree of the accelerator is reduced and to end at a point at which the opening degree is reduced again after being increased.

As described, the engine includes an internal combustion engine adapted to increase an output power according to an opening degree of the accelerator. In addition, the learning zone is set to begin from a point at which an opening degree of the accelerator is reduced and to end at a point at which the opening degree is increased.

The vehicle control system is further configured to: compare the fuel consumption obtained during execution of the fuel saving control to the fuel consumption obtained without executing the fuel saving control in the same learning zone; and learn in increase of fuel consumption in the learning zone based on the larger fuel consumption.

According to the present invention, the fuel saving control includes a plurality of controls executed based upon different execution conditions. In addition, the vehicle control system is further configured to: compare actual fuel consumption obtained during an actual running under the fuel saving control to the fuel consumption obtained from a simulation based on the actual running under another kind of the fuel saving control; and learn an increase of fuel consumption during the actual running if the actual fuel consumption is larger than the fuel consumption obtained from the simulation.

The vehicle control system is further configured to select the fuel saving control that was effective to save fuel the next time the vehicle travels through the learning zone, if a plurality of learned fuel consumption values are available in the learning zone.

Specifically, the fuel saving control includes: a neutral coasting control in which the engine is disconnected from a powertrain when the engine is not required to generate power during running: a free-run stop and start control in which the engine is disconnected from a powertrain while stopping fuel supply thereto when the engine is not required to generate power during running; a deceleration-based stop and start control in which the engine is disconnected from a powertrain while stopping fuel supply thereto when an engine braking force is not required during decelerating the vehicle; and a stop-based stop and start control in which fuel supply to the engine is stopped when the vehicle is stopped.

Thus, according to the present invention, the vehicle control system makes an assessment of effectiveness of the fuel saving control based on the actual fuel consumption during execution of the fuel saving control and the actual fuel consumption without executing the fuel saving control. The assessment result is used to select the fuel saving control to be executed or to determine not to execute any control in the learning zone. Therefore, the fuel saving control can be carried out appropriately to save fuel in accordance with the running condition of the vehicle.

As described, a substantially straight zone where the accelerator will not be operated frequently is selected as the learning zone. Therefore, the learning of the fuel consumption will not be carried out unnecessarily or excessively.

If the learned fuel consumption value of only one of the fuel saving controls is available, an assessment of the effectiveness of the available fuel saving control can be made by comparing it to an estimated value estimated from a simulation of another control based on the running information such as the vehicle speed, a road gradient etc. in the learning zone where the available learned fuel consumption value was obtained. Thus, even if the learned fuel consumption value of only one of the fuel saving controls is available, the fuel saving control can be carried out effectively to save the fuel.

BRIEF DESCRIPTION OF SEVERAL VIEWS OF THE DRAWINGS

FIGS. 8A-8C show learning databases in which FIG. 8A shows identification (ID) tags of the learning zones, FIG. 8B shows a database of a deterioration flag of each learning zone and each control, and FIG. 8C shows a database of an effectiveness flag of each learning zone and each control.

DETAIL DESCRIPTION OF THE INVENTION

Next, preferred examples of the present invention will be explained hereinafter. The vehicle control system according to the preferred example is configured to selectively execute a fuel saving control of a vehicle having an engine so as to reduce fuel consumption. Specifically, the vehicle control system is configured to cut off fuel supply to the engine upon satisfaction of a predetermined condition, e.g., when an accelerator pedal is returned during running, or when a vehicle speed falls below a predetermined speed. Such fuel saving control includes a neutral coasting control (to be abbreviated as the "N coasting" hereinafter), a stop-based stop and start control (to be abbreviated as the "S & S" control hereinafter), a deceleration-based S & S control, and a free-run S & S control.

Under the N coasting, a clutch disposed between an engine and a powertrain is brought into disengagement when an accelerator pedal is returned at a speed higher than a predetermined speed to interrupt a power transmission between the engine and drive wheels. That is, the vehicle is brought into neutral stage. In turn, under the stop-based S & S control, an idling of the engine is stopped by stopping fuel supply thereto when a brake pedal is depressed in the stopping vehicle, and the engine is restarted when the brake pedal is released or the accelerator pedal is depressed. On the other hand, under the deceleration-based S & S control, the clutch is brought into disengagement to disconnect the engine from the powertrain while stopping the fuel supply to the engine when the vehicle is decelerated by returning the accelerator pedal or depressing the brake pedal, and the engine is restarted when the accelerator pedal is depressed or the brake pedal is released. Likewise, under the free-run S & S control, the clutch is brought into disengagement to disconnect the engine from the powertrain while stopping the fuel supply to the engine when the accelerator pedal is returned during propulsion of the vehicle at a relatively high speed, and the engine is restarted when the vehicle speed falls to a restarting speed or the accelerator pedal is depressed.

Figure 24:
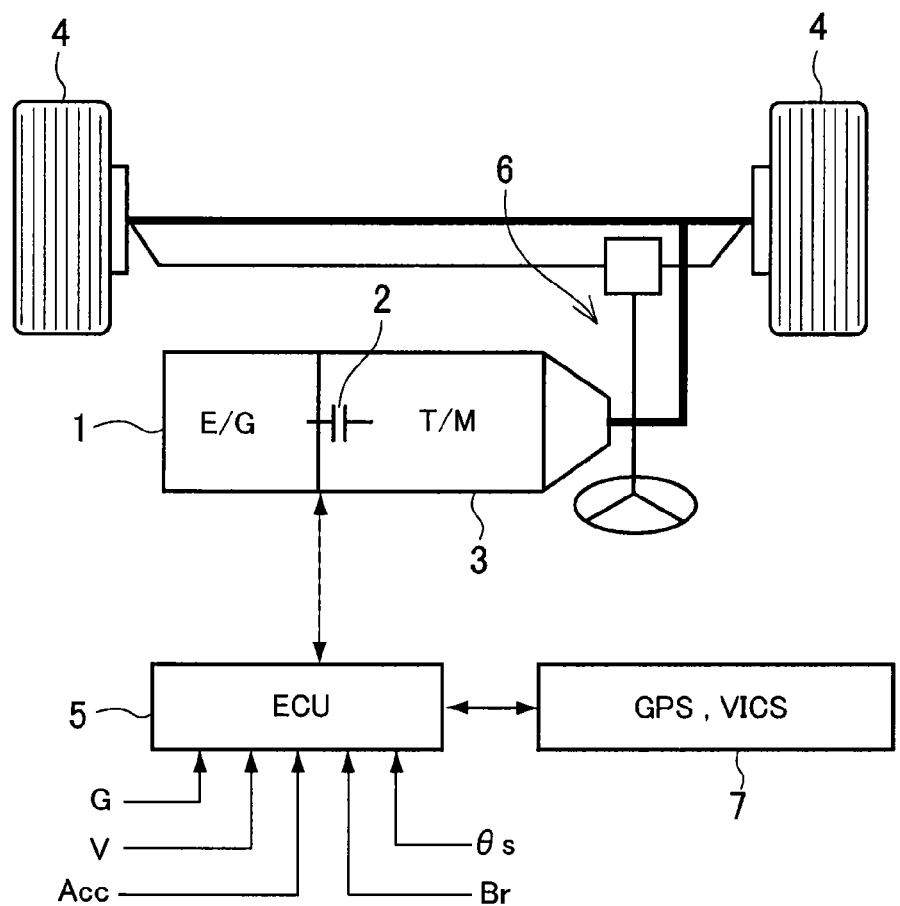
FIG. 24 is a view schematically showing a structure of the vehicle to which the control system of the present invention is applied.

The vehicle control system according to the preferred example is configured to learn and to make an assessment of the efficacy of the fuel saving control in relation to a location at which the fuel saving control is executed. The vehicle control system is further configured to select the most effective fuel saving control to be executed or to determine not to execute any kind of the fuel saving control. To this end, as shown in FIG. 24, the vehicle to which the control system is applied is provided with devices for detecting a speed, an acceleration, a braking condition, and a current location.

In the vehicle, a transmission (indicated as T/M in FIG. 24) 3 is connected to an output side of an engine (indicated as E/G in FIG. 24) 1 through a clutch 2. The engine 1 is started by rotating a crankshaft by a starter motor (not shown) while supplying fuel thereto until a rotational speed of the crankshaft reaches a self-sustaining speed, and stopped by stopping fuel supply thereto. For example, an internal combustion engine such as a gasoline engine and a diesel engine may be used as the engine 1. The clutch 2 is an automatic friction clutch that is controllable electrically or hydraulically. Both a geared transmission and a continuously variable transmission may be used as the transmission 3, and a speed ratio of the transmission 3 is changed automatically depending on a vehicle speed and a drive demand. Thus, power of the engine 1 is delivered to the drive wheels 4 through the transmission 3, and a power transmission between the engine 1 and the drive wheels 4 is interrupted by bringing the clutch 2 into disengagement to disconnect the engine 1 from the powertrain to the drive wheels 4.

In order to selectively execute and terminate the fuel saving control, the vehicle is provided with an electronic control unit (abbreviated as the "ECU" hereinafter) 11 configured to electrically control the engine 1, the clutch 2 and the transmission 3. Specifically, the ECU 5 is comprised mainly of a microcomputer configured to carry out a calculation based on input data and preinstalled data, and to transmit a calculation result in the form of command signals for starting and stopping the engine 1 and for bringing the clutch 2 into engagement and disengagement. For example, longitudinal acceleration G, a vehicle speed V, an opening degree of an accelerator Acc, a brake signal Br representing an actuation of the brake, a steering angle θs of a steering device 6, and so on are sent to the ECU 5.

The vehicle is further provided with a running environment detecting device 7 configured to detect a position of the vehicle based on signals transmitted from a satellite, a signpost, an FM radio station etc. while obtaining road information. For example, a GPS (i.e., Global Positioning System) and a VICS (i.e., Vehicle Information Communication System: registered TM) may be used as the running environment detecting device 7. Data collected by the running environment detecting device 7 is transmitted to the ECU 5, and running information of the vehicle is saved in the ECU 5 while being associated with the positional information and the road information.

Figure 1:
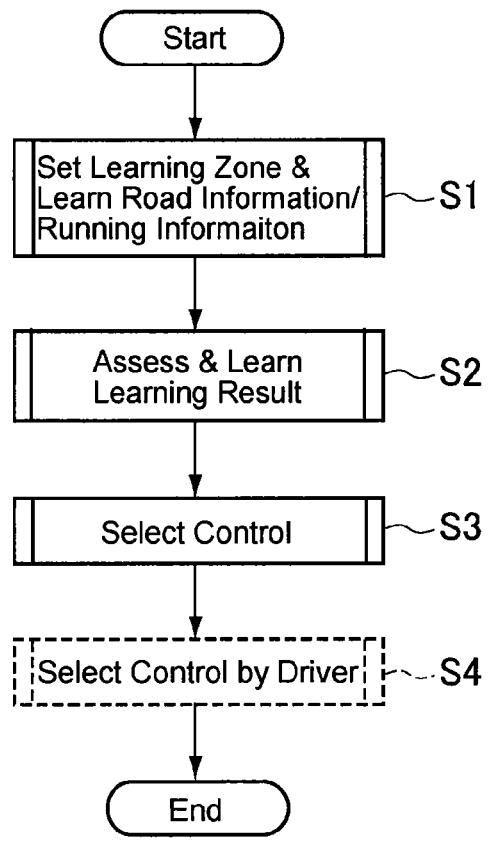
FIG. 1 is a general flowchart showing one example of the control carried out by the vehicle control system of the present invention.
Figure 2:
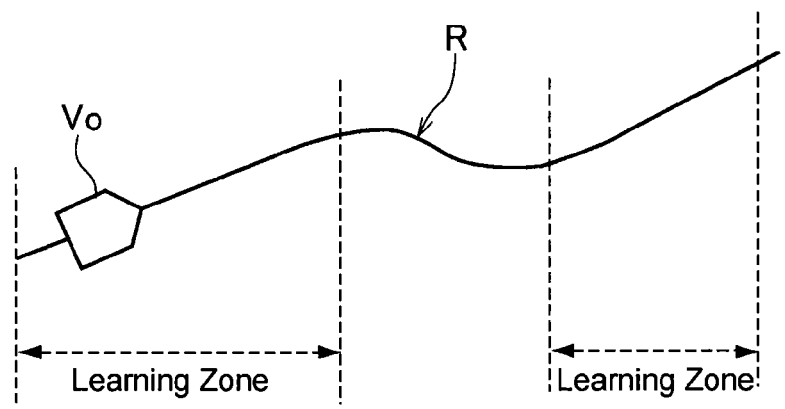
FIG. 2 is a view schematically showing a learning zone.

According to the preferred example, the vehicle control system is configured to divide an actual route traveled by the vehicle into predetermined learning zones, and to learn fuel consumption (or a fuel consumption rate per unit of distance) within the learning zone. Then, the vehicle control system makes an assessment of a learning result to select one of the fuel saving controls, and selectively executes the selected control depending on a situation. A procedure of selecting the fuel saving control is generally shown in FIG. 1. At step S1, a learning zone is set, and road information and running information including fuel consumption within the learning zone are learned. Then, at step S2, the learning result is assessed and learned, and at step S3, one of the fuel saving controls is selected to be executed based on the assessment result. At step S3, it is also determined whether or not to execute the fuel saving control. Optionally, at step S4, it is possible to select the fuel saving control to be executed based on a driver's intention. Hereinafter, those steps will be explained in more detail.

First Example of Setting the Learning Zone

Figure 3:
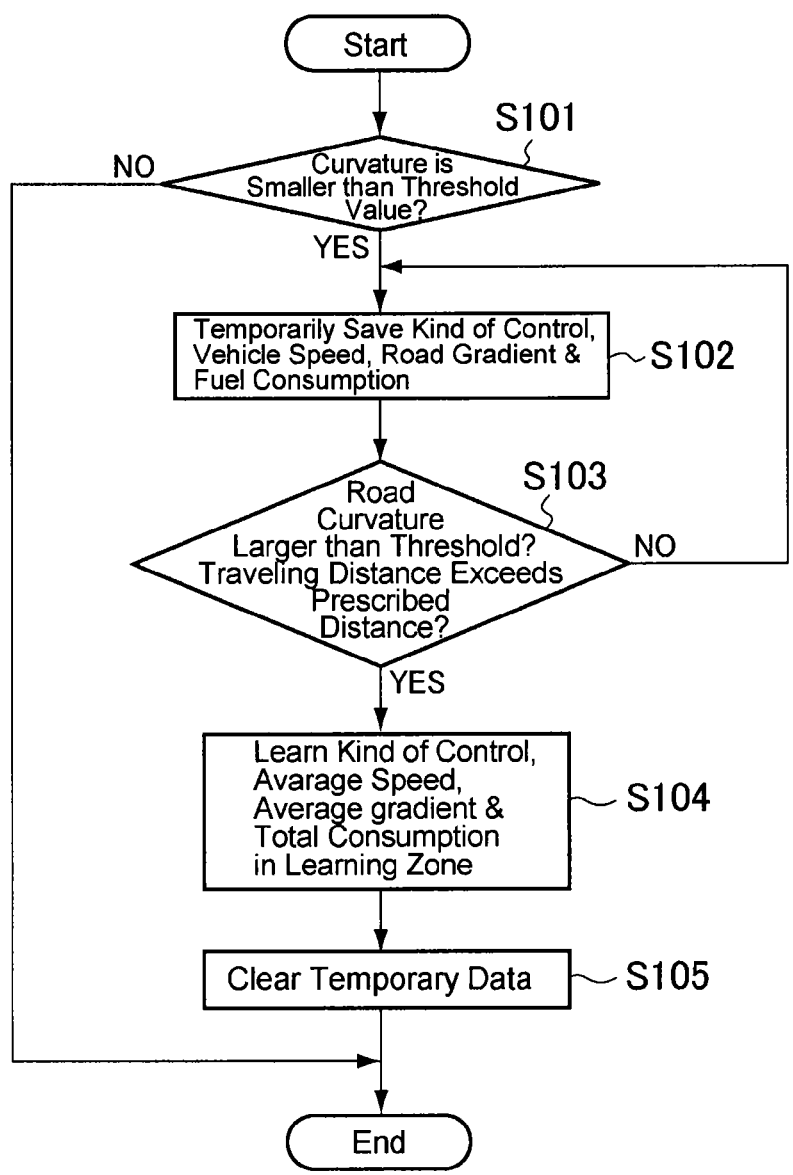
FIG. 3 is a flowchart showing one example of setting the learning zone.

In order to learn fuel consumption and to make an assessment of the learning result, a predetermined section of a traveling route suitable to execute the fuel saving control is selected as the "learning zone". Specifically, a section of a route R to be travelled by the vehicle V0 where a curvature thereof is smaller than a predetermined value is selected as the learning zone. The first example of the learning control executed within the learning zone thus determined will be explained with reference to FIG. 3. First of all, it is determined whether or not a curvature of the road is smaller than a predetermined threshold value (at step S101). To this end, the threshold value of the road curvature is determined at a design phase as one of the execution conditions of the fuel saving control. Specifically, a curvature of the road can be determined based not only on a steering angle but also on detection data of the running environment detecting device 7 such as the GPS and the VICS. If the answer of step S101 is NO, this means that the vehicle is not running within the learning zone. In this case, therefore, the routine is ended without carrying out subsequent controls.

By contrast, if the answer of step S101 is YES, a kind of the control (e.g., the N coasting, the free-run S & S or a normal control) currently being executed or commenced at this point, a vehicle speed, a road gradient, fuel consumption etc. are saved temporarily (at step S102). At this step, the road gradient can be calculated based not only on an opening degree of the accelerator Acc and acceleration G but also on the detection data of the running environment detecting device 7, and the fuel consumption can be calculated by multiplying an injection quantity (governed by an opening degree of the accelerator) by a number of times of fuel injection.

Then, it is determined whether or not the curvature of the road exceeds the threshold value, or whether or not a traveling distance within the learning zone (i.e., a distance from the point at which the road curvature becomes smaller than the threshold value) exceeds a prescribed distance (at step S103). If a distance of the learning zone where the data is collected is too long, the road conditions other than the curvature such as the road gradient may be changed significantly and hence the collected data would be disturbed by such change in the road condition even if the change is averaged. In order to avoid such disadvantage, the prescribed distance is determined in a manner to avoid such disturbance of the collected data. If the curvature of the road is smaller than the threshold value and the traveling distance within the learning zone has not yet reached the prescribed distance, the answer of step S103 will be NO. In this case, the vehicle is still traveling within the learning zone and hence the control of step S102 is continued. That is, a kind of the control vehicle speed, a road gradient, fuel consumption are saved temporarily.

By contrast, if the curvature of the road exceeds the threshold value, or if the traveling distance within the learning zone exceed the prescribed distance, a kind of the fuel saving control or the normal control executed in the learning zone, and an average vehicle speed, an average road gradient, and a total fuel consumption within the learning zone are learned based on data currently collected and saved (at step S104). Then, the data temporarily saved at step S102 is cleared at step S105, and the routine is ended. During traveling within the learning zone thus set, the vehicle should be accelerated, decelerated, and coasted depending on a road conditions and traffic. That is, those factors can be learned within the learning zone taking account of such a running environment. In addition, since the learning zone is set within a substantially straight region and within the prescribed distance, such learning and assessment will not be carried out more than necessary.

Second Example of Setting the Learning Zone

Alternatively, the learning zone may also be set on the basis of a change in running information of the vehicle, instead of the road condition. As described, the N coasting control and the free-run S & S control are executed based on a driver's intention to maintain the current running condition without executing an accelerating operation and a decelerating operation. That is, such driver's intention can be estimated from operations of the accelerator pedal and the brake pedal to set the learning zone based on the driver's intention. The second example for setting the learning zone based on the driver's intention will be explained with reference to FIG. 4. First of all, it is determined whether or not the accelerator pedal is released (at step S111). Specifically, such determination of step S111 can be made by determining whether or not an opening degree of the accelerator ACC is zero or smaller than a predetermined reference value.

If the accelerator pedal is depressed so that the answer of step S111 is NO, the routine is returned to continue the ongoing control. By contrast, if the accelerator pedal is returned so that the answer of step S111 is YES, a kind of the control (e.g., the N coasting, the free-run S & S or a normal control) currently executed or commenced at this point, a vehicle speed, a road gradient, fuel consumption etc. are saved temporarily (at step S112). That is, the control similar to the aforementioned step S102 is carried out. Then, it is determined whether or not the brake pedal is depressed (at step S113). If the brake pedal is currently not depressed so that the answer of step S113 is NO, this means that the driver does not intend to decelerate the vehicle strongly. Therefore, then it is determined whether or not the accelerator pedal is still released (at step S114) so as to determine a fact that the accelerator pedal has been depressed. If the answer of step S114 is NO, the routine is returned to step S112 to continuously save a kind of the control vehicle speed, a road gradient, and fuel consumption.

By contrast, if the accelerator pedal is still released so that the answer of step S114 is YES, a kind of the fuel saving control or the normal control executed in the learning zone, and an average vehicle speed, an average road gradient, and a total fuel consumption within the learning zone are learned based on data currently collected and saved (at step S115). Then, the data temporarily saved at step S112 is cleared at step S116, and the routine is ended. Thus, the controls similar to those of the aforementioned steps S104 and S105 are carried out sequentially at steps S115 and S116. If the brake pedal is depressed so that the answer of step S113 is YES, the N coasting control or the free-run S & S control is terminated. In this case, therefore, the routine advances directly to step S116 to clear the data temporarily saved at step S112.

Figure 4:
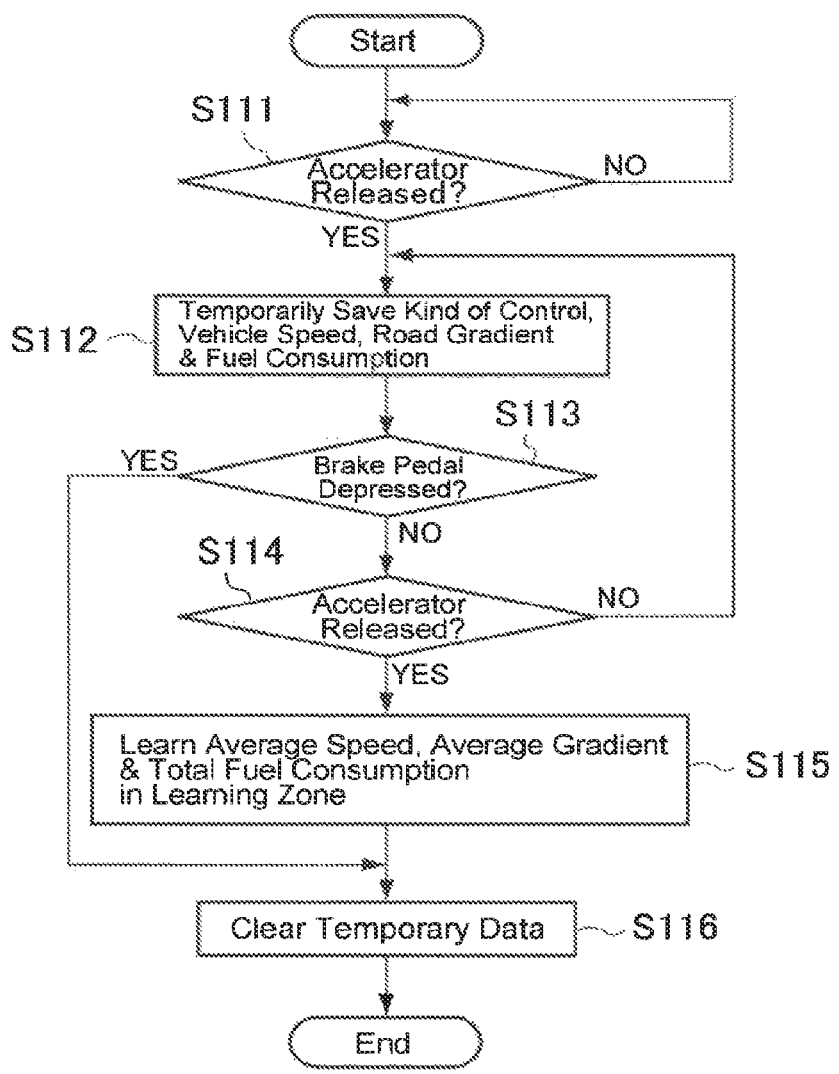
FIG. 4 is a flowchart showing another example of setting the learning zone.
Figure 5:
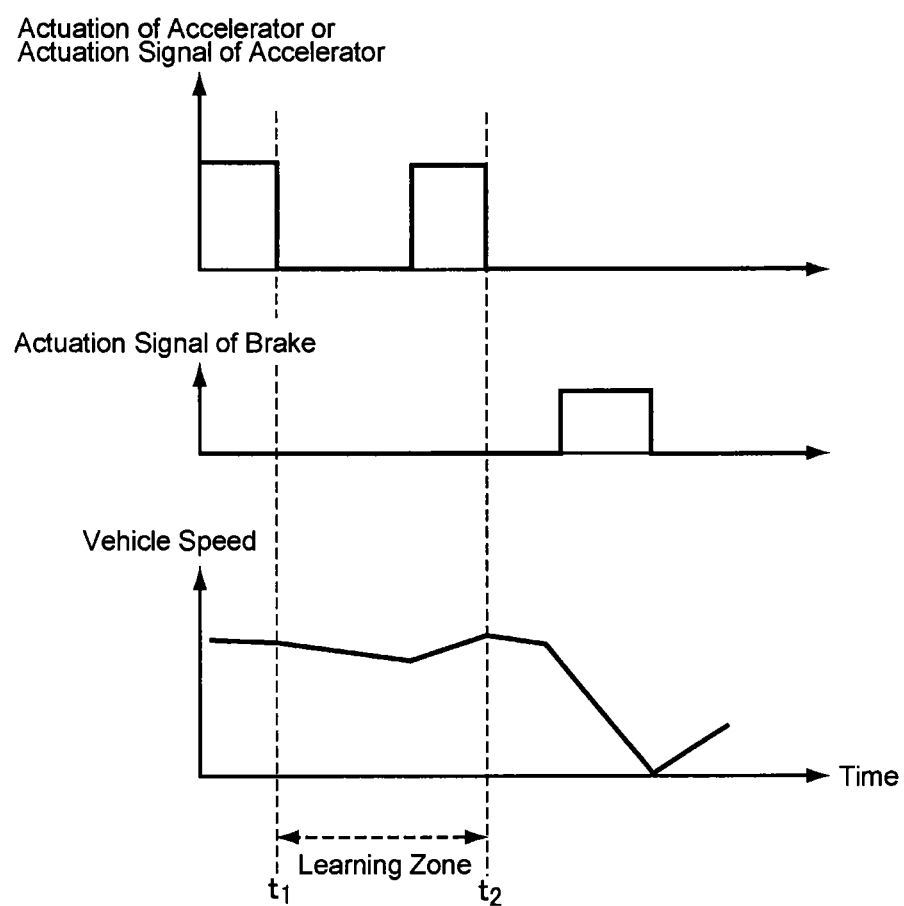
FIG. 5 is a time chart showing the learning zone set by the control shown FIG. 4.

FIG. 5 is a time chart showing the learning zone set by the control shown in FIG. 4. When the accelerator pedal is returned at point t1, the point t1 is set as a starting point of the learning zone. Consequently, the vehicle speed V is gradually lowered, and the accelerator pedal is depressed to increase the vehicle speed V. Then, when the vehicle speed V is increased to a speed intended by the driver, the accelerator pedal is returned again at point t2. Since the brake pedal is not depressed during the period from the point t1 to the point t2, the point t2 is set as an end point of the learning zone. Thus, the vehicle is decelerated, accelerated, and coasted depending on a road conditions and traffic during traveling within the learning zone thus set so that the average vehicle speed, the average gradient, the average fuel consumption etc. can be learned taking account of such running environment.

Third Example of Setting the Learning Zone

On the other hand, the stop-based S & S control and the deceleration-based S & S control are executed when stopping or decelerating the vehicle. In those cases, therefore, the learning zone may be set from a point at which the accelerator is released to a point at which the accelerator pedal is depressed. The third example for setting the learning zone based on an operation of the accelerator pedal will be explained with reference to FIG. 6. As the aforementioned step S111 of the second example shown in FIG. 4, first of all, it is determined whether or not the accelerator pedal is released (at step S121). Specifically, such determination of step S121 may also be made by determining whether or not an opening degree of the accelerator ACC is zero or smaller than a predetermined reference value.

If the accelerator pedal is depressed so that the answer of step S121 is NO, the routine is returned to continue the ongoing control. By contrast, if the accelerator pedal is returned so that the answer of step S111 is YES, a kind of the control (e.g., the N coasting, the free-run S & S or a normal control) currently executed or commenced at this point, a vehicle speed, an engine stopping period, and fuel consumption etc. are saved temporarily (at step S122). Then, it is determined whether or not the accelerator pedal is depressed (at step S123). Specifically, the determination of step S123 can be made based on a fact that an opening degree of the accelerator is larger than a predetermined reference value. If the accelerator pedal is not depressed so that the answer of step S123 is NO, this means that the vehicle is being decelerated or to be stopped. In this case, therefore, it is determined whether or not the vehicle speed is lower than a predetermined speed, or whether or not the vehicle is stopped (at step S124).

If the answer of step S124 is NO, this means that the vehicle is still being decelerated. In this case, therefore, the routine is returned to step S122 to continuously save a kind of the control (e.g., the N coasting, the free-run S & S or a normal control) currently executed, a vehicle speed, an engine stopping period, and fuel consumption. By contrast, if the answer of step S124 is YES, a stopping period of the vehicle is measured and a counted value of the vehicle stopping period is temporarily saved (at step S125).

Then, it is determined whether or not the accelerator pedal is depressed (at step S126). If the accelerator pedal is not depressed so that the answer of step S126 is NO, this means that the vehicle is still stopping. In this case, therefore, the routine is returned to step S125 to continue the measuring of the vehicle stopping period. As described, the stop-based S & S control and the deceleration-based S & S control are executed under the condition that the vehicle is not accelerated. Therefore, if the accelerator pedal is depressed so that the answer of step S126 is YES, the S & S control is terminated. In this case, the routine advances to step S127 to learn and save an average vehicle speed, an average road gradient, a total fuel consumption, and a stopping period of the vehicle within the learning zone from step S121 at which the accelerator pedal was released to step S126 at which the accelerator pedal was depressed. Then, the data temporarily saved at step S122 is cleared at step S128, and the routine is ended. By contrast, if the accelerator pedal is depressed so that the answer of step S123 is YES, this means that the vehicle is accelerated before stopped. In this case, therefore, the routine advances directly to step S128 to clear the data temporarily saved at step S122 without carrying out the learning after accelerating the vehicle.

Figure 6:
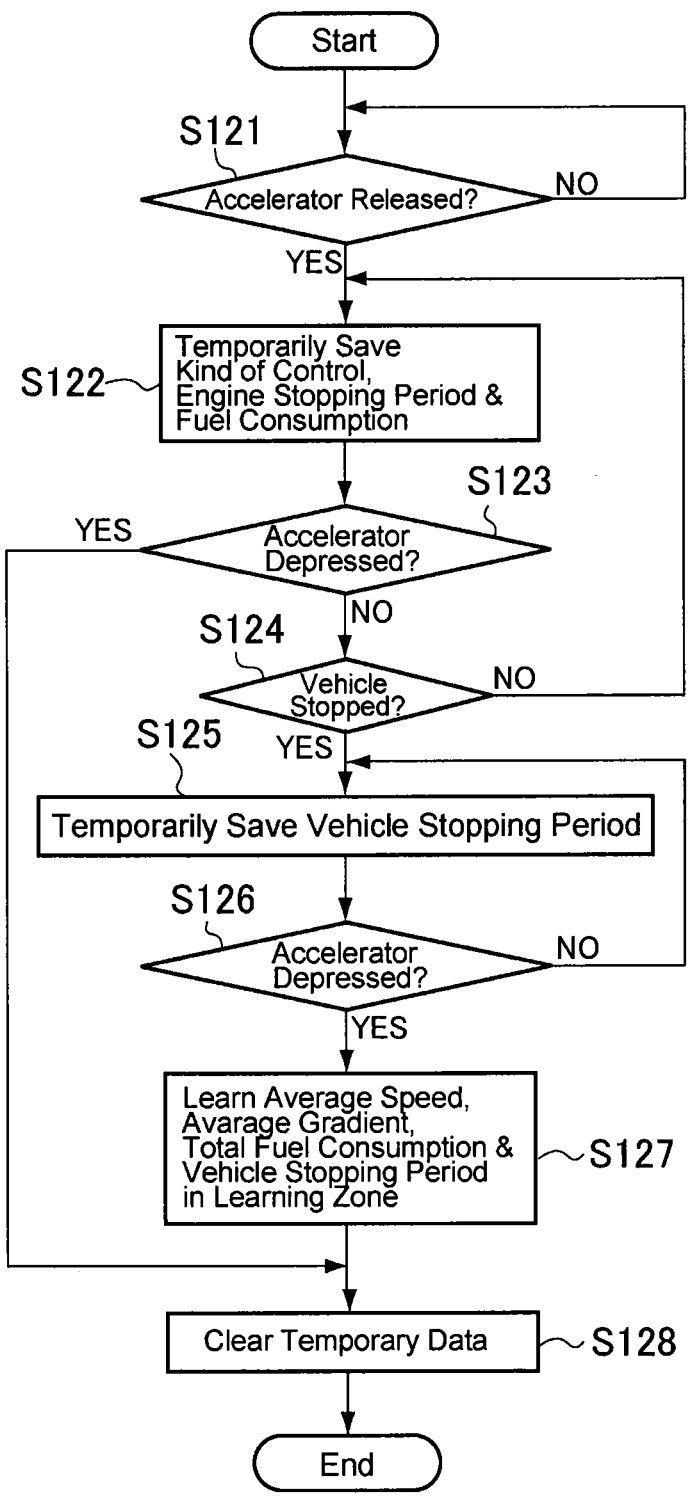
FIG. 6 is a flowchart showing still another example of setting the learning zone.
Figure 7:
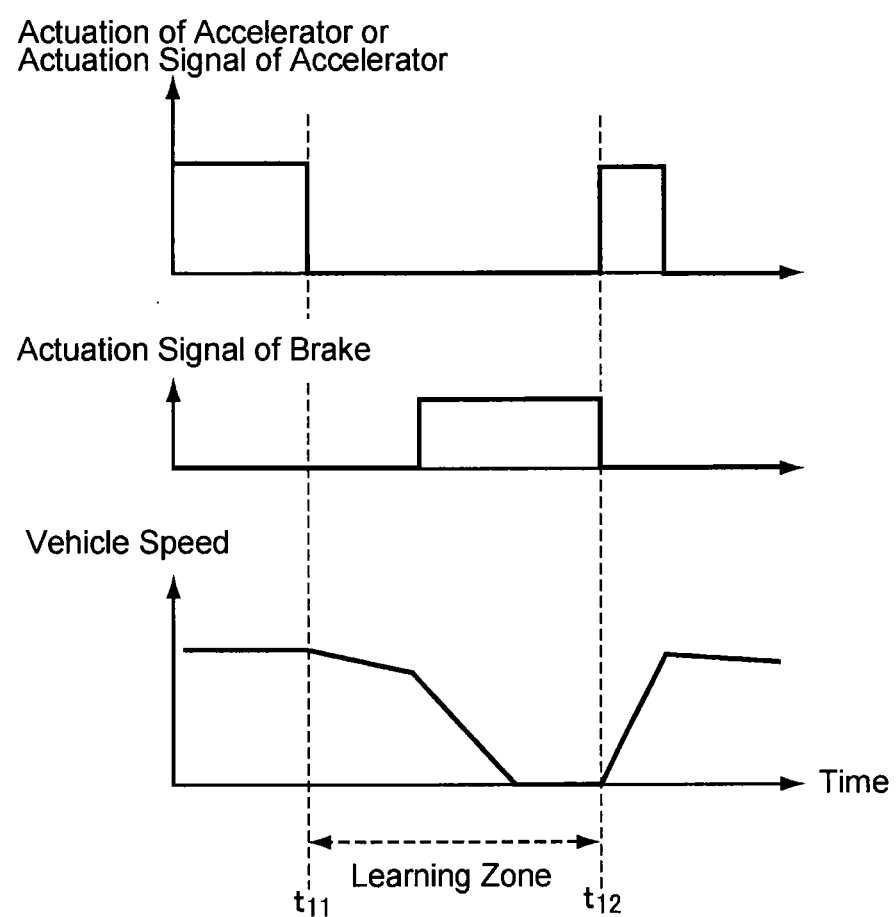
FIG. 7 is a time chart showing the learning zone set by the control shown FIG. 6.

FIG. 7 is a time chart showing the learning zone set by the control shown in FIG. 6. When the accelerator pedal is returned at point t11, the point t11 is set as a starting point of the learning zone. Consequently, the vehicle speed V is gradually lowered, and when the brake pedal is depressed so that the vehicle is stopped, the measuring of the stopping period of the vehicle is started. Then, when the brake pedal is released and the accelerator pedal is depressed to start the vehicle at point t12, the point t12 is set as an end point of the learning zone. Thus, a braking force is adjusted while selectively executing the fuel cut-off depending on road conditions and traffic during traveling within the learning zone thus set so that the average vehicle speed, the average gradient, the total fuel consumption, and the vehicle stopping time can be learned taking account of such running environment.

Example of Making a Database of the Learned Value

Figures 8A, 8B, 8C:
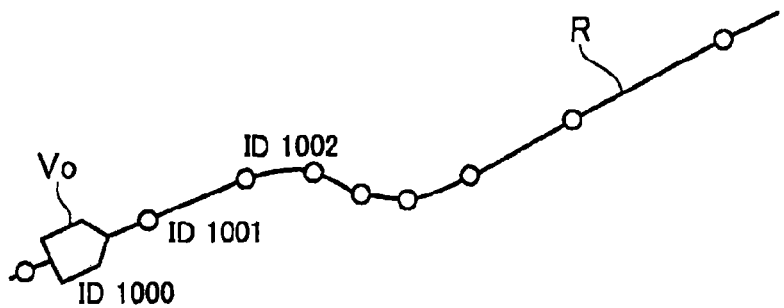

In any of the foregoing examples, the starting point and the end point of the learning zone are determined on the basis of the running information and the environmental information of the vehicle, and a kind of the control, a vehicle speed etc. are learned within the learning zone. The learned values are utilized to control the vehicle next time the vehicle travels the same learning zone. For this purpose, it is preferable to make a database of the learned values, and examples of such databases are shown in FIG. 8. The vehicle control system of the preferred example is configured to select the most appropriate control to save the fuel in each traveling zone, and the selection result is utilized next time the vehicle travels the same traveling zone. To this end, each collected data (i.e., learned value) about a kind of control, a fuel consumption and so on is individually associated with the learning zone and stored into the database. Specifically, as shown in FIG. 8, a unique identification number (abbreviated as "ID" number hereinafter) starting from 1000 is allocated to each learning zone. A newly learned fuel consumption is compared to the stored data about the fuel consumption in the same zone to determine an increase in fuel consumption. Specifically, the database shown in FIG. 8A is prepared by collecting information about increase in fuel consumption in each learning zone from "1000" during execution of the N coasting control, the free-run S & S control, the stop-based S & S control, and the deceleration-based S & S control. In the database shown in FIG. 8B, an increment flag "0" represents a fact that the fuel consumption has not yet been learned, and an increment flag "1" represents a fact that the fuel consumption is increased.

In turn, FIG. 8C is a database prepared by collecting information about effectiveness of the N coasting control and the free-run S & S control for saving fuel without stopping the engine 1, and the stop-based S & S control and the deceleration-based S & S control for saving fuel while stopping the engine 1. In the left column of FIG. 8C, an effectiveness flag "2" represents a fact that the free-run S & S control is more effective to save fuel than the N coasting control, an effectiveness flag "1" represents a fact that the N coasting control is more effective to save fuel than the free-run S & S control, and an effectiveness flag "0" represents a fact that the effectiveness of those controls has not yet been learned. Likewise, in the right column of FIG. 8C, the effectiveness flag "2" represents a fact that the deceleration-based S & S control is more effective to save the fuel than the stop-based S & S control, the effectiveness flag "1" represents a fact that the stop-based S & S control is more effective to save the fuel than the deceleration-based S & S control, and an effectiveness flag "0" represents a fact that the effectiveness of those controls has not yet been learned.

First Assessment Example

Figure 9:
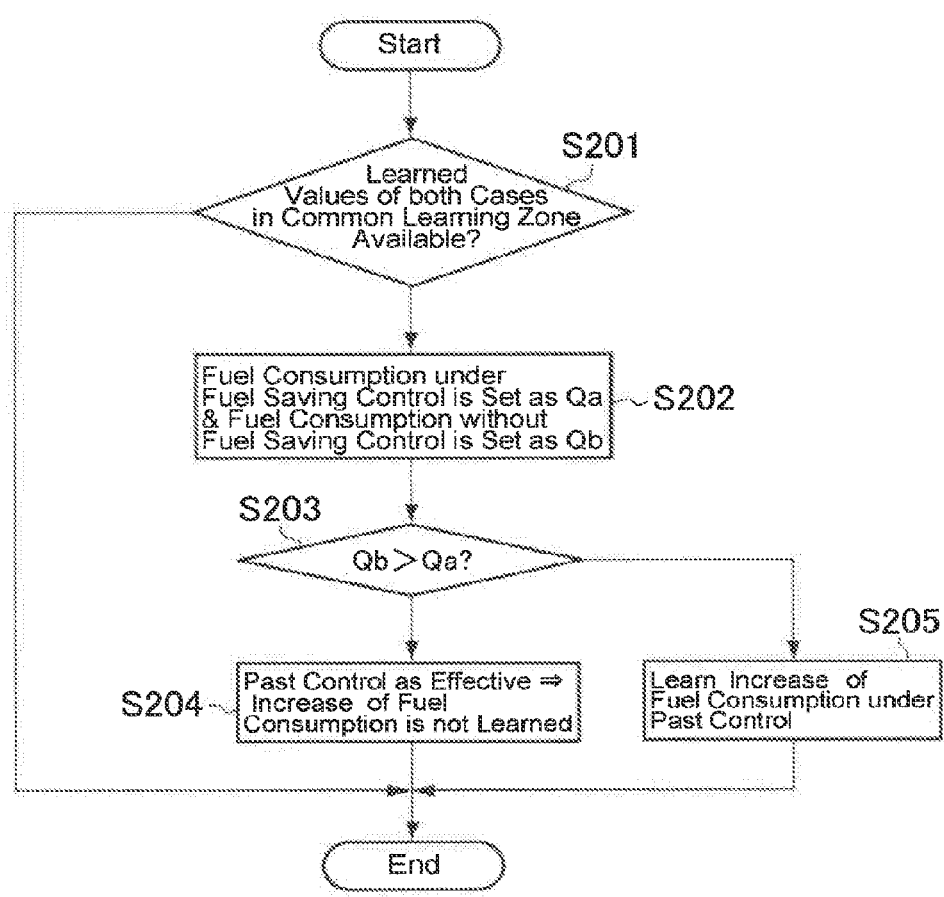
FIG. 9 is a flowchart showing a control example of making an assessment of a learning result and a learned value during execution of the N coasting or the free-run S & S control.

Here will be explained an assessment of effectiveness of the fuel saving controls to save fuel or energy. Such assessment can be made based on the learned values of fuel consumption in the learning zone. Referring now to FIG. 9, there is shown the first assessment example for making an assessment of effectiveness of the N coasting control and the free-run S & S control to save fuel. First of all, availability of the learned value of the fuel consumption obtained during execution of the N coasting control or the free-run S & S control, and the learned value obtained without executing those controls in the common learning zone is determined (at step S201). If neither value is available, the routine is ended without making assessment of the effectiveness of the controls. By contrast, if the learned values of both cases are available so that the answer of step S201 is YES, a fuel consumption learned during execution of the N coasting control or the free-run S & S control is treated as "Qa", and a fuel consumption learned without executing those controls is treated as "Qb" (at step S202). Then, the fuel consumption "Qa" learned during execution of the N coasting control or the free-run S & S control and the fuel consumption "Qb" learned without executing those controls are compared to each other (at step S203).

If the fuel consumption "Qa" is smaller than the fuel consumption "Qb" so that the answer of step S203 is YES, this means that the N coasting control or the free-run S & S control previously executed in the learning zone was effective to reduce the fuel consumption. In this case, an increase of fuel consumption during execution of the N coasting control or the free-run S & S control is not learned (at step S204), and in the database shown in FIG. 8 (b), the increment flag is maintained to "0". Then, the routine is ended.

By contrast, if the fuel consumption "Qa" is larger than the fuel consumption "Qb" so that the answer of step S203 is NO, this means that the N coasting control or the free-run S & S control previously executed in the learning zone was not effective to reduce the fuel consumption. In this case, an increase of fuel consumption during execution of the N coasting control or the free-run S & S control is learned (at step S205), and in the database shown in FIG. 8 (b), the increment flag is set to "1". Then, the routine is ended.

Thus, the routine shown in FIG. 9 is configured to make an assessment of effectiveness of the N coasting control or the free-run S & S control to reduce the fuel consumption in the learning zone. The routine shown in FIG. 9 thus configured may also be used to make an assessment of effectiveness of other controls to reduce fuel consumption. Likewise, an assessment of effectiveness of a case in which none of the fuel saving control is carried out may also be made by comparing the learned value obtained without executing the fuel saving control with the learned value obtained during execution of the fuel saving control.

Second Assessment Example

Figure 10:
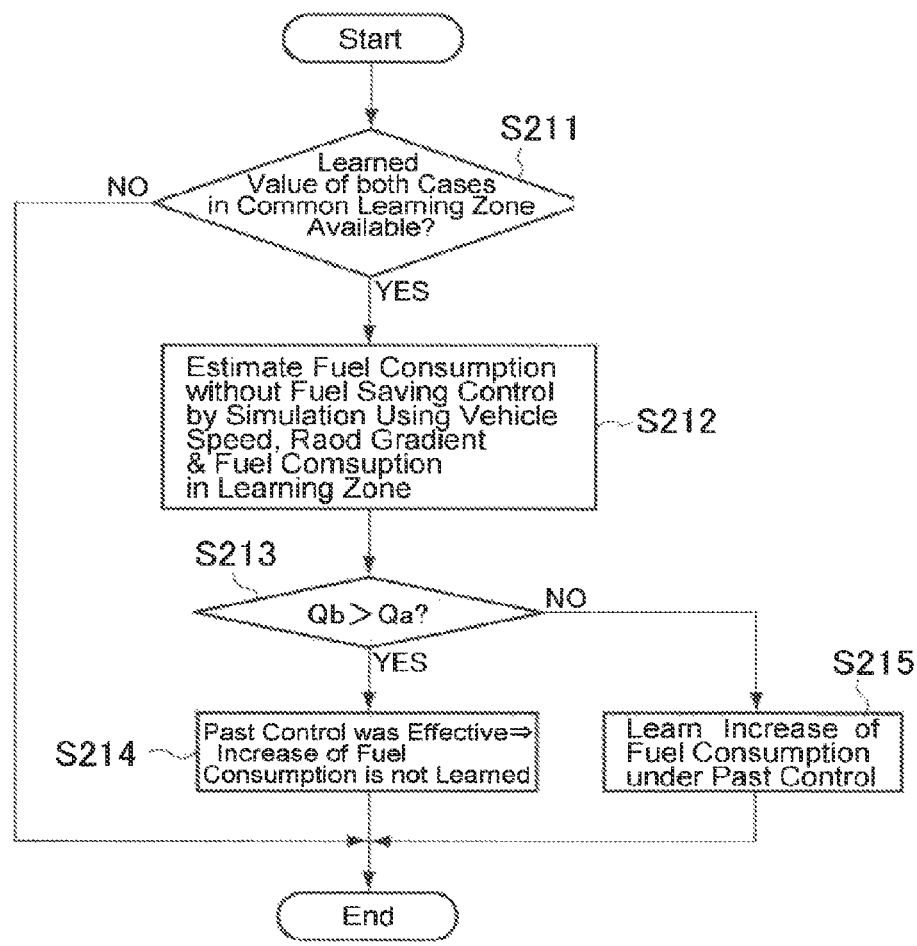
FIG. 10 is a flowchart showing an example of determining an effectiveness of the control by comparing the learned value obtained during an actual running with a learned value obtained from a simulation.

Given that only the learned value of fuel consumption during execution of the N coasting control or the free-run S & S control in a predetermined learning zone is available, an assessment of effectiveness of the fuel saving control may also be made by comparing a learned value obtained during an actual running and a learned value obtained from a simulation as shown in FIG. 10. According to the example shown in FIG. 10, first of all, unavailability of the learned value of the fuel consumption obtained during execution of the N coasting control or the free-run S & S control, and the learned value obtained without executing those controls in the common learning zone is determined (at step S211). Specifically, it is determined whether or not the learned value of the fuel consumption obtained during execution of the N coasting control or the free-run S & S control is available, and whether or not the learned value obtained without executing those controls is unavailable. If the learned values of both cases are available so that the answer of step S211 is NO, those learned values can be compared to each other without using the routine shown in FIG. 10. In this case, therefore, the routine in ended without carrying out any specific controls.

By contrast, if only the learned value of the fuel consumption obtained during execution of the N coasting control or the free-run S & S control is available so that the answer of step S211 is YES, a fuel consumption within the given learning zone without carrying out the N coasting control or the free-run S & S control is estimated based on a simulation (at step S212). Specifically, such simulation is carried out using actual values of a vehicle speed V, an opening degree of the accelerator, a road gradient, and a fuel consumption during an accrual running under the N coasting control or the free-run S & S control within the given learning zone, and the fuel consumption without carrying out the N coasting control or the free-run S & S control is estimated based on the simulation result. Then, a fuel consumption "Qa" learned during execution of the N coasting control or the free-run S & S control is compared with a fuel consumption "Qb" estimated based on a simulation result (at step S213).

Figure 11:
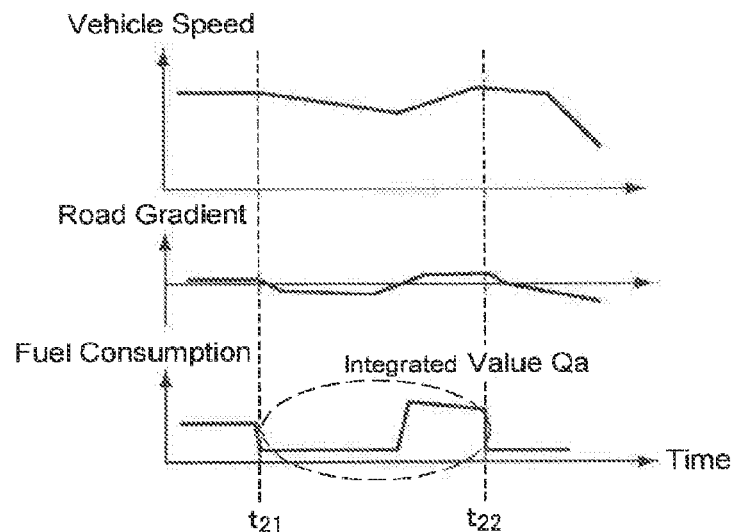
FIG. 11 is a time chart showing a zone where an actual fuel consumption to be compared with the simulated value is integrated.

Procedures for calculating the fuel consumptions Qa and Qb will be explained with reference to FIG. 11. As the examples shown in FIGS. 4 and 5, when the vehicle starts running on a downslope, the accelerator pedal is returned so that the N coasting control or the free-run S & S control is started at point t21, and the point t21 is set as the starting point of the learning zone. Consequently, fuel consumption (or fuel consumption rate) is reduced. The vehicle speed is reduced gradually with a reduction in a gradient of the downslope, and when a road gradient changes to an upward grade, the accelerator pedal is depressed so that the N coasting control or the free-run S & S control is terminated. Consequently, the fuel consumption and the vehicle speed are increased. Then, the accelerator pedal is returned when the speed of the vehicle traveling on a flat road is increased to a desired speed at point t22, and the point t22 is set as the end point of the learning zone. In this situation, the fuel consumption Qa is calculated by integrating the fuel consumption during a period from the point t21 to the point t22. If the vehicle travels through the zone shown in FIG. 11 without carrying out the N coasting control or the free-run S & S control at the same speed, the fuel would be consumed in an amount to maintain the engine speed to an idling speed. Accordingly, the fuel consumption Qb can be calculated by carrying out a simulation of fuel consumption based on the above-mentioned assumption.

Referring back to FIG. 10, the comparison similar to the aforementioned step S203 shown in FIG. 9 is carried out to determine whether or not the fuel consumption Qa learned during execution of the N coasting control or the free-run S & S control is smaller than the fuel consumption Qb estimated based on a simulation result. If the fuel consumption "Qa" is smaller than the fuel consumption "Qb" so that the answer of step S213 is YES, this means that the N coasting control or the free-run S & S control previously executed in the learning zone was effective to reduce the fuel consumption. In this case, an increase of fuel consumption during execution of the N coasting control or the free-run S & S control is not learned (at step S214), and in the database shown in FIG. 8 (b), the increment flag is maintained to "0". Then, the routine is ended.

By contrast, if the fuel consumption "Qa" is larger than the fuel consumption "Qb" so that the answer of step S203 is NO, this means that the N coasting control or the free-run S & S control previously executed in the learning zone was not effective to reduce the fuel consumption. In this case, an increase of fuel consumption during execution of the N coasting control or the free-run S & S control is learned (at step S215), and in the database shown in FIG. 8 (b), the increment flag is set to "1". Then, the routine is ended.

Thus, even if the learned value of fuel consumption to be compared with the learned value of the fuel consumption obtained during execution of the fuel saving control is not available but data relating to the available learned value of fuel consumption can be obtained by a simulation, the routine shown in FIG. 10 may be used to determine the effectiveness of the energy saving control.

Third Assessment Example

Figure 12:
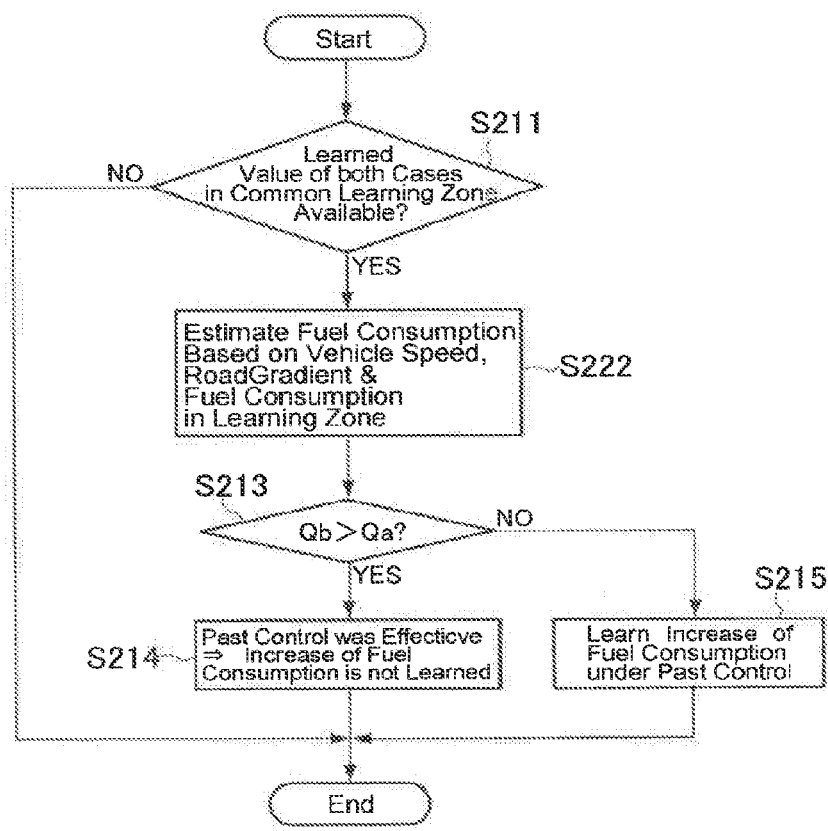
FIG. 12 is a flowchart showing an example of making an assessment by comparing the fuel consumption during the fuel saving control and the fuel consumption of a case in which the fuel saving control is not executed.
Figure 13A:
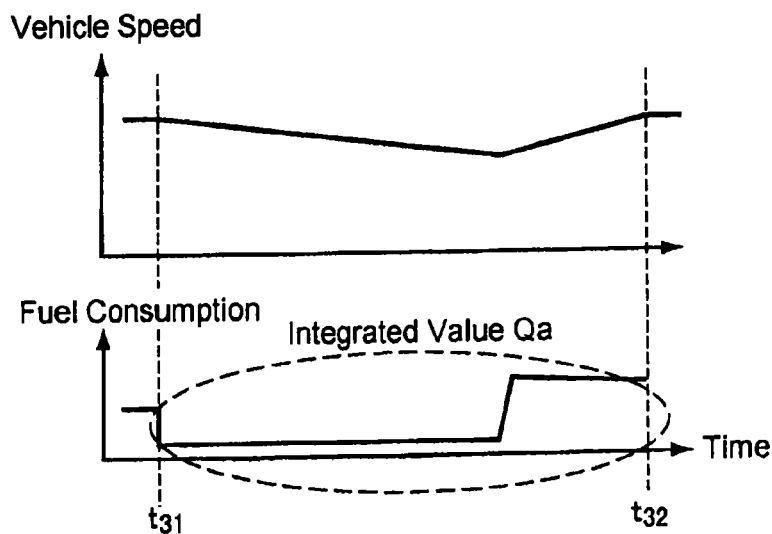
FIG. 13A is a time chart showing a zone where the fuel consumption is estimated during execution of the fuel saving control.

Here will be explained another example of estimating fuel consumption instead of carrying out a simulation with reference to FIG. 12. According to the example shown in FIG. 12, below-explained step S222 is carried out instead of the aforementioned step S212 of the second assessment example shown in FIG. 10, and remaining steps are similar to those of FIG. 10. At step S222, specifically, a fuel consumption without carrying out the N coasting control or the free-run S & S control is estimated utilizing data relating to a fuel consumption learned during execution of those fuel saving controls. For example, under the conditions shown in FIG. 13A, the accelerator pedal is returned so that the N coasting control or the free-run S & S control is started at point t31. Consequently, fuel consumption (or fuel consumption rate) is reduced and the vehicle speed is gradually lowered. In this situation, the engine 1 is disconnected from the powertrain. Therefore, a running resistance of the vehicle is relatively small and hence a reduction rate of the vehicle speed is small. Then, when the vehicle speed is lowered to a certain level, the accelerator pedal is depressed to increase the vehicle speed and the fuel consumption (or fuel consumption rate) is increased in accordance with an opening degree of the accelerator. Consequently, the N coasting control or the free-run S & S control is terminated. Then, when the vehicle speed is increased to the prior speed, the accelerator pedal is returned at point t32, and the point t32 is set as the end point of the learning zone. In this situation, the fuel consumption Qa during execution of the N coasting control or the free-run S & S control is calculated by integrating fuel consumption from the point t31 to the point t32.

Figure 13B:
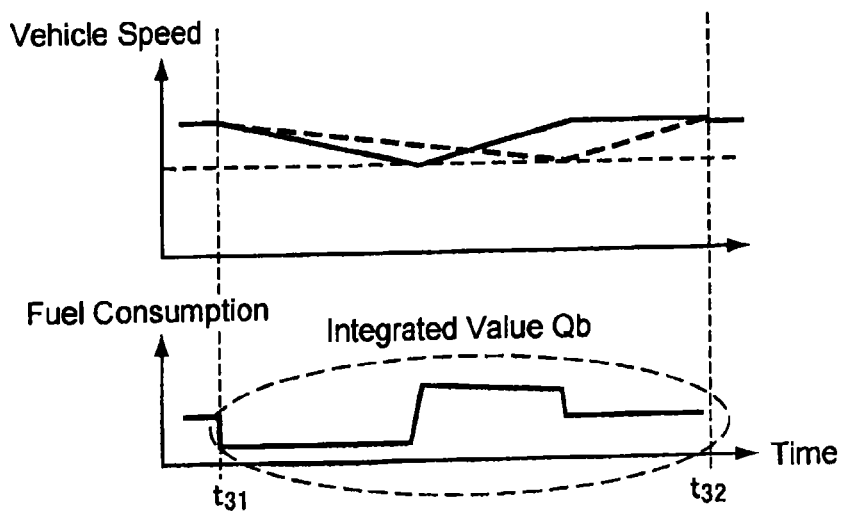
FIG. 13B is a time chart showing a zone where the fuel consumption is estimated without carrying out the fuel saving control.

In this learning zone, the fuel consumption Qb without carrying out the N coasting control or the free-run S & S control can be estimated by the following procedures shown in FIG. 13B. When the accelerator pedal is released at point t31 at a predetermined vehicle speed, the engine 1 is rotated passively by an inertial force so that an engine braking force is applied to the vehicle. In this case, deceleration and speed of the vehicle are estimated from data about the engine braking force collected based on a result of simulation carried out in advance using the actual engine 1. In this situation, the vehicle is decelerated strongly in comparison with the case in which the N coasting control or the free-run S & S control is executed. Therefore, it is expected that the driver depresses the accelerator pedal at an earlier timing. Given that a depression of the accelerator pedal is identical to that of the case shown in FIG. 13A, the vehicle speed is also increased to the prior level at an earlier timing. Consequently, the accelerator pedal is returned before the timing t32 so that the fuel consumption (or fuel consumption rate) is reduced. In this situation, the accelerator is depressed at an angle possible to maintain the current vehicle speed, therefore, the fuel consumption can be estimated based on the vehicle speed and a road gradient. Specifically, the fuel consumption without carrying out the N coasting control or the free-run S & S control is expected to be changed as indicated by a line between the point t31 and the point t32, and the fuel consumption Qb is calculated by integrating the fuel consumption during the period from the point t31 to the point t32.

Referring back to FIG. 12, then the fuel consumption Qa is compared with the fuel consumption Qb (at step S213), and the learning of an increase of fuel consumption is executed depending on the comparison result (at step S214 or S215).

Fourth Assessment Example

Here will be explained an assessment of effectiveness of the N coasting control and the free-run S & S control in which the engine 1 is disconnected form the transmission 3 during running. Under the N coasting control, the engine 1 is disconnected from the powertrain while being maintained to the idling speed when the vehicle speed is higher than the predetermined speed and the engine 1 is not required to be operated. That is, although the fuel is consumed to keep the engine speed to the idling speed, the fuel will not be consumed to start the engine 1. On the other hand, under the free-run S & S control, the engine 1 is disconnected from the powertrain while being stopped when the vehicle speed is higher than the predetermined speed and the engine 1 is not required to be operated. That is, although the fuel is not consumed to keep the engine speed to the idling speed, the fuel will be consumed to start the engine 1. Thus, the fuel is consumed in different manners in the N coasting control and the free-run S & S control, and hence the fuel consumptions would be different during execution of those controls depending on a running condition.

Figure 14:
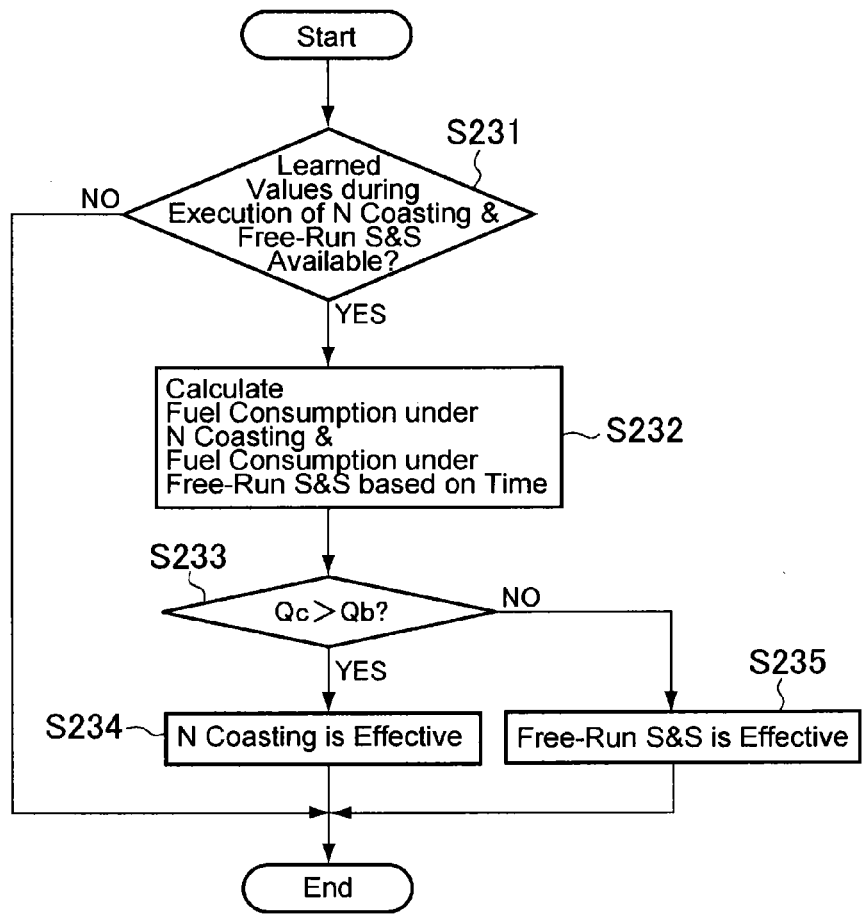
FIG. 14 is a flowchart showing an example of making an assessment by comparing the fuel consumption during execution of the N coasting control with the fuel consumption during execution of the S & S control.

An example of making an assessment of effectiveness of the N coasting control and the free-run S & S control in a predetermined learning zone will be explained with reference to FIG. 14. First of all, availability of the learned values of the fuel consumption obtained during execution of the N coasting control and the free-run S & S control is determined (at step S231). If any one of the learned value of those cases is not available so that the answer of step S231 is NO, the routine is ended without carrying out any specific control. By contrast, if both learned values of the fuel consumption are available so that the answer of step S231 is YES, a fuel consumption Qb consumed to keep the engine speed to the idling speed under the N coasting control and a fuel consumption Qc corresponding to a required energy to restart the engine 1 under the free-run S & S control are calculated (at step S232).

Figure 15:
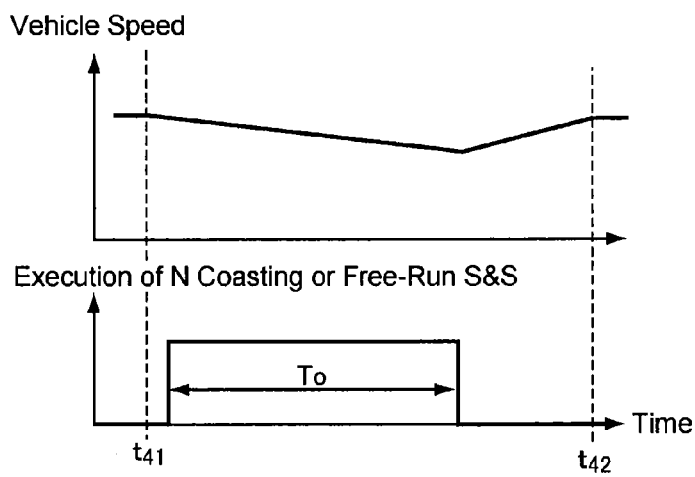
FIG. 15 is a time chart showing a stopping time of the engine.

A period of learning the fuel consumption in those cases will be explained with reference to FIG. 15. As the foregoing examples, the starting point is set when the accelerator pedal is returned at predetermined vehicle speed (at point t41). The N coasting control or the free-run S & S control is started immediately after the point t41 and continued until the accelerator pedal is depressed to increase the vehicle speed.

Given that the N coasting control is selected, an output of the engine is increased according to an opening degree of the accelerator while bringing the clutch 2 into engagement when terminating the N coasting control. By contrast, given that the free-run S & S control is selected, a motoring of the engine 1 is carried out while bringing the clutch 2 into engagement when terminating the free-run S & S control. Then, when the vehicle speed is raised to a desired speed, the accelerator pedal is returned at point t42, and the point t42 is set as the end point of the learning zone. That is, in case the N coasting control is selected, the fuel is consumed during a period T0 to keep the engine sped to the idling speed. By contrast, in case the free-run S & S control is selected, an electric power is consumed to restart the engine 1.

The fuel consumption and the electric consumption during the period T0 in both cases are calculated by the following procedures. Specifically, the fuel consumption Qb under the N coasting control can be calculated by multiplying a fuel consumption Q0 per unit of time consumed to keep the engine speed to the idling speed by a duration time T0. On the other hand, the fuel consumption Qc can be calculated based on an electric consumption to restart the engine 1 estimated from specifications of the motor and the battery and an energy density of the fuel.

The fuel consumptions Qb and Qc thus calculated are compared to each other at step S233. If the duration time T0 of the N coasting control is short, the fuel consumption Qb will not be increased to keep the engine speed to the idling speed so that the answer of step S233 will be YES (Qc>Qb). In this case, therefore, the ECU 5 determines that the N coasting control is more effective to save the fuel than the free-run S & S control (at step S234). By contrast, if the duration time T0 of the N coasting control is long, the fuel consumption Qb will be increased to keep the engine speed to the idling speed so that the answer of step S233 will be NO (Qc≤Qb). In this case, therefore, the ECU 5 determines that the free-run S & S is more effective to save the fuel than the N coasting control control (at step S234). Then, the aforementioned database is updated.

Fifth Assessment Example

Figure 16:
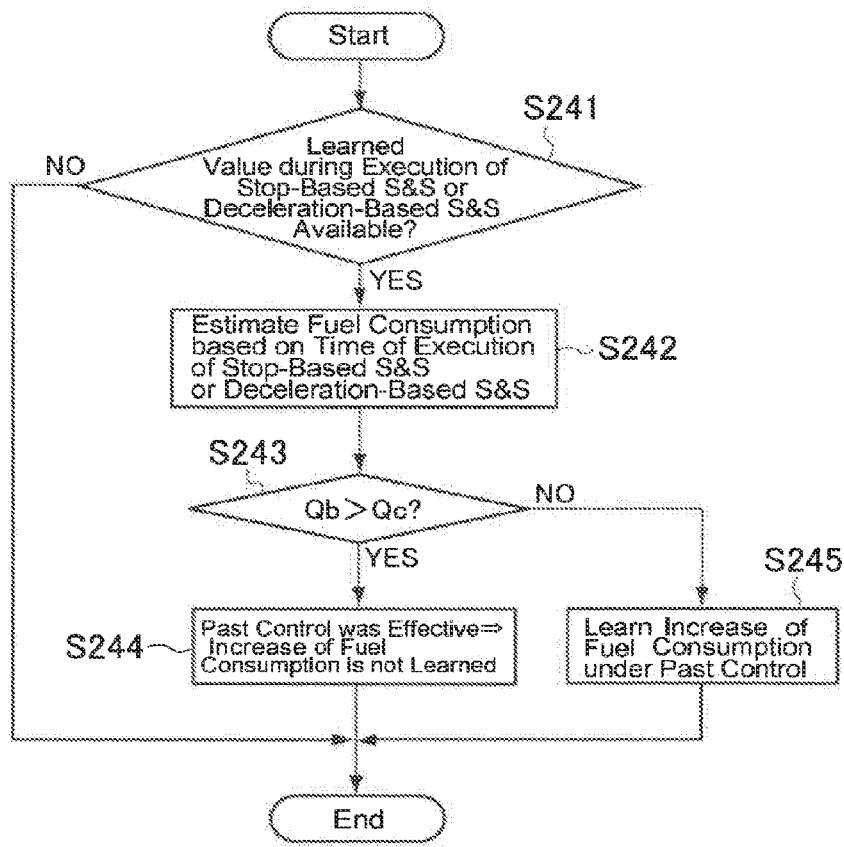
FIG. 16 is a flowchart showing an example of making an assessment of the deceleration-based S & S control or the stop-based S & S control by comparing the fuel consumption with the energy consumption of a case in which those fuel saving controls are not executed.

The above-explained method for determining effectiveness of the fuel saving controls by comparing fuel consumptions to start the engine 1 may also be used to determine effectiveness of the stop-based S & S control and the deceleration-based S & S control as shown in FIG. 16. According to the fifth assessment example, the learned value of the fuel consumption will not be compared to other kinds of controls. That is, the fifth assessment example is carried out when only the learned value of the stop-based S & S control or the deceleration-based S & S control is available to determine effectiveness of those controls. First of all, availability of the learned value of the fuel consumption obtained during execution of the stop-based S & S control or the deceleration-based S & S control is determined (at step S241). If none of those values are available so that the answer of step S241 is NO, the routine shown in FIG. 16 is ended without carrying out any specific controls. By contrast, if any of those values are available so that the answer of step S241 is YES, a fuel consumption Qb without carrying out the stop-based S & S control or the deceleration-based S & S control is estimated from a period of stopping the engine 1 (at step S242). The fuel consumption Qb thus estimated corresponds to a reduction in the fuel consumption during execution of the stop-based S & S control or the deceleration-based S & S control.

Figure 17:
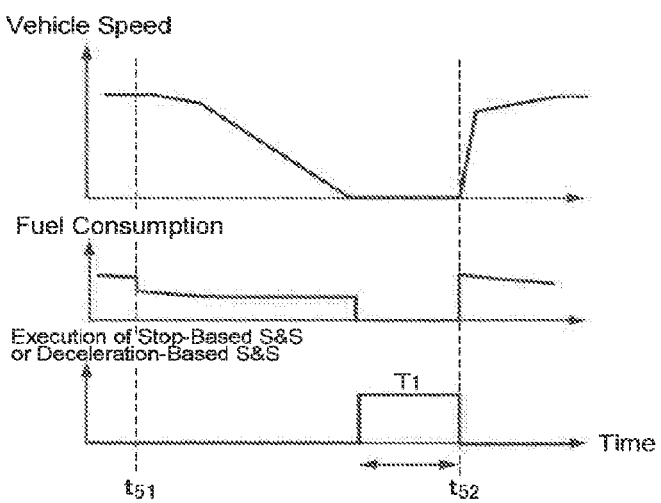
FIG. 17 is a time chart showing a stopping time of the engine.

The period T1 of stopping the engine 1 used to estimate the fuel consumption Qb as an amount of the fuel to be reduced during execution of the stop-based S & S control or the deceleration-based S & S control will be explained with reference to FIG. 17. In FIG. 17, the learning zone is set from point t1 at which the accelerator pedal is returned to point t52 at which the accelerator pedal is depressed. As a result of returning the accelerator pedal, the vehicle speed is reduced and the engine 1 is stopped when the vehicle is stopped eventually. The engine 1 is stopped until the accelerator pedal is depressed. In this situation, the fuel will not be consumed during the period T1. By contrast, if the stop-based S & S control or the deceleration-based S & S control is not executed, the fuel will be consumed during the period T1. That is, the fuel consumption Qb to be consumed in case the stop-based S & S control or the deceleration-based S & S control is not executed can be calculated by multiplying a fuel consumption Q0 per unit of time consumed to keep the engine speed to the idling speed by the period T1 (Qb=Q0·T1). On the other hand, a fuel consumption Qc to be consumed to restart the engine 1 by the motor can be calculated based on an electric consumption to restart the engine 1 estimated from specifications of the motor and the battery and an energy density of the fuel.

The fuel consumptions Qb and Qc thus calculated are compared to each other at step S243. If the period T1 of stopping the engine 1 by the stop-based S & S control or the deceleration-based S & S control is long, the fuel consumption Qb as a fuel saving amount will be increased in comparison with that of the case in which the engine speed is maintained to the idling speed during the period T1. In this case, the answer of step S243 will be YES (Qb>Qc). That is, the stop-based S & S control or the deceleration-based S & S control previously executed in the learning zone was effective to reduce the fuel consumption. In this case, therefore, an increase of fuel consumption during execution of the stop-based S & S control or the deceleration-based S & S control is not learned (at step S244). By contrast, if the period T1 of stopping the engine 1 is short, the engine speed is maintained to the idling speed in long time and hence the fuel consumption Qb as a fuel saving amount of the stop-based S & S control or the deceleration-based S & S control will be decreased. In this case, therefore, the answer of step S243 will be NO (Qb≤Qc). That is, the stop-based S & S control or the deceleration-based S & S control previously executed in the learning zone was not effective to reduce the fuel consumption. In this case, therefore, an increase of fuel consumption during execution of the stop-based S & S control or the deceleration-based S & S control is learned (at step S245). Then, the aforementioned database is updated.

Sixth Assessment Example

Figure 18:
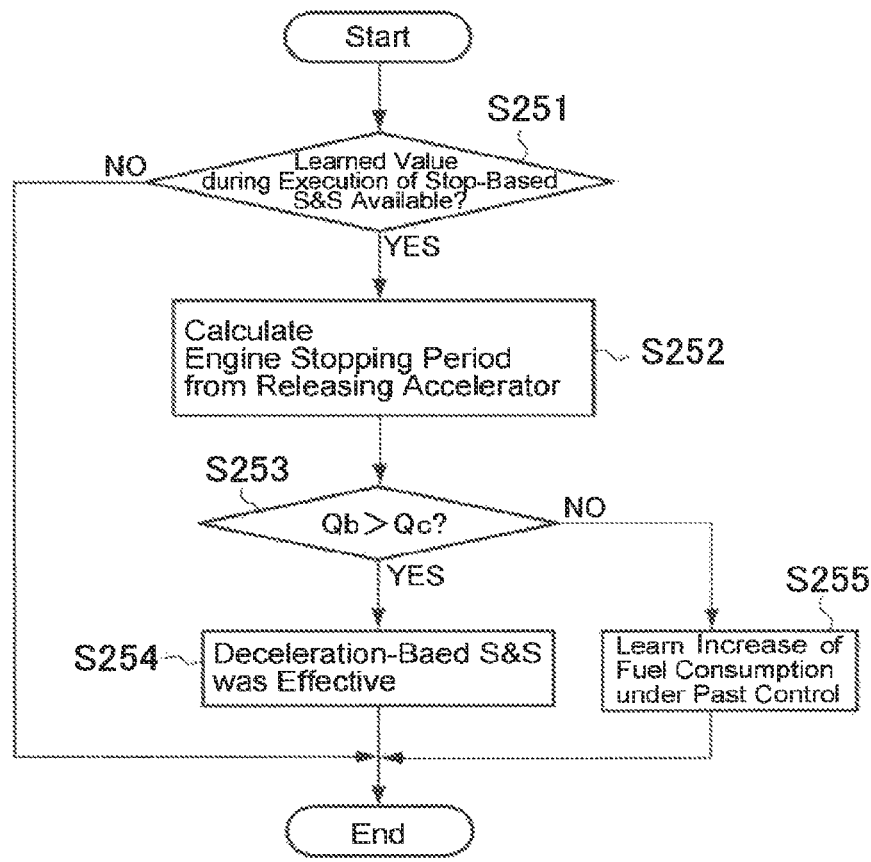
FIG. 18 is a flowchart showing an example of making an assessment by comparing the fuel consumption during execution of the stop-based S & S control with the fuel consumption during execution of the deceleration-based S & S control estimated in the common learning zone.

If the effectiveness of the stop-based S & S control was evaluated by the routine shown in FIG. 16 but the period T1 of stopping the engine 1 was not long enough to reduce fuel consumption, a possibility to reduce fuel consumption by the other kind of fuel saving control can be determined by the routine shown in FIG. 18. Specifically, if the fuel consumption estimated from the electric consumption to restart the engine 1 was smaller than the reduction in the fuel consumption achieved by stopping the engine 1, the possibility to reduce fuel consumption by the other kind of fuel saving control can be determined based on the past running information and the environmental information. First of all, availability of the learned values of the fuel consumption obtained during execution of the stop-based S & S control is determined (at step S251). Specifically, such determination can be made with reference to the aforementioned database. If the learned value during execution of the stop-based S & S control is not available so that the answer of step S251 is NO, the determination cannot be carried out and hence the routine is ended.

Figure 19:
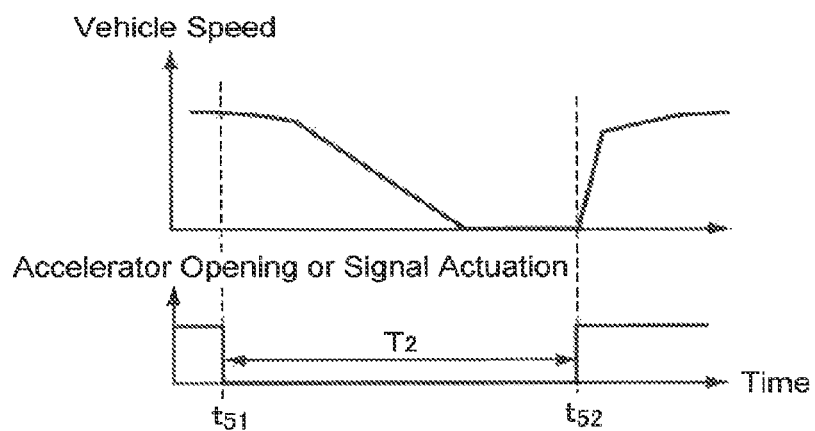
FIG. 19 is a time chart showing a stopping time of the engine during execution of the deceleration-based S & S control.

By contrast, if the learned value during execution of the stop-based S & S control is available so that the answer of step S251 is YES, a period T2 of stopping the engine 1 from a point at which the accelerator pedal was returned to start the previously executed stop-based S & S control is calculated based on the running information during execution of the stop-based S & S control (at step S252). As described, the deceleration-based S & S control is executed to stop the engine 1 when an opening degree of the accelerator is reduced to be smaller than the predetermined value during decelerating the vehicle. Specifically, in the situation of the vehicle shown in FIG. 17, the period T2 of stopping the engine 1 by the stop-based S & S control starts from the point t51 when the accelerator pedal is returned and ends at the point t52 when the accelerator pedal is depressed to restart the engine 1. The period T2 is illustrated schematically in FIG. 19.

During the period T2, given that the declaration-based S & S control is executed, the fuel will not be consumed within the period T2. However, if the stop-based S & S control is not executed during the period T2 for some reason, the fuel will be consumed to keep the engine speed to the idling speed. That is, the fuel consumption Qb to be consumed in case the stop-based S & S control or the deceleration-based S & S control is not executed can be calculated by multiplying the fuel consumption Q0 per unit of time consumed to keep the engine speed to the idling speed by the period T2 ($Qb = Q0 \cdot T2$). On the other hand, the fuel consumption Qc to be consumed to restart the engine 1 by the motor can be calculated based on an electric consumption to restart the engine 1 estimated from specifications of the motor and the battery and an energy density of the fuel.

The fuel consumptions Qb and Qc thus calculated are compared to each other at step S253. If the period T2 of stopping the engine 1 by the deceleration-based S & S control is long, the fuel consumption Qb as a fuel saving amount will be increased in comparison with that of the case in which the engine speed is maintained to the idling speed during the period T2. In this case, the answer of step S253 will be YES ($Qb > Qc$). Consequently, the ECU 5 learns a fact the deceleration-based S & S control previously executed in the learning zone was effective to reduce the fuel consumption (at step S254). By contrast, if the period T2 of stopping the engine 1 is short, the engine speed is maintained to the idling speed in long time and hence the fuel consumption Qb as the fuel saving amount of the deceleration-based S & S control will be decreased. In this case, therefore, the answer of step S253 will be NO ($Qb \leq Qc$). That is, the deceleration-based S & S control previously executed in the learning zone was not effective to reduce the fuel consumption. In this case, therefore, an increase of fuel consumption during execution of the deceleration-based S & S control previously executed is learned (at step S255). Then, the aforementioned database is updated.

First Selection Example of the Fuel Saving Control

Figure 20:
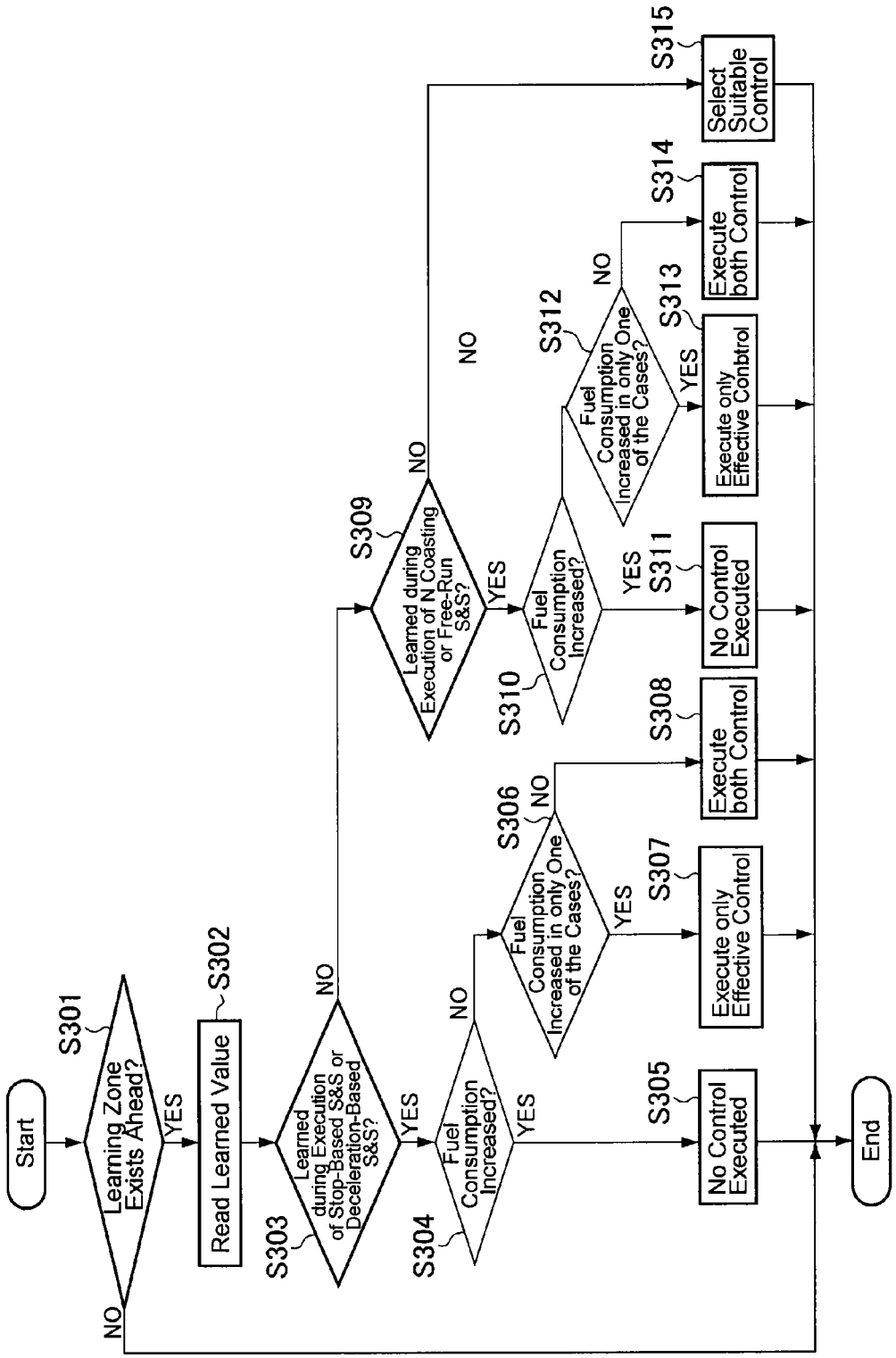
FIG. 20 is a flowchart showing an example of selecting the most suitable control to reduce fuel consumption.

As described, the vehicle control system of the present invention is configured to divide the traveling route into the learning zones based on the actual running information. According to the foregoing examples, the execution records of the stop-based S & S control and the N coasting control, and the assessments of fuel saving effect of those controls in each learning zone are saved in the form of the learning values in the database. In addition, the presumed assessment of fuel saving effect of other alternative control in each learning zone is also saved in the database. The learned values thus saved in the database are used to select the fuel saving control to be executed when the vehicle travels in the corresponding learning zone. Specifically, the fuel saving control is selected based on the effectiveness to save the fuel as shown in FIG. 20. As described, according to the preferred example, the vehicle is provided with the running environment detecting device 7 adapted to detect a current position of the vehicle in a map. Therefore, an existence of a zone to execute the fuel saving control ahead on the traveling route is determined based on the detected position and with reference to the database (at step S301). A distance from a point to commence the selection example shown in FIG. 20 is determined in a manner to ensure sufficient time to carry out the routine to be explained hereinafter. If the answer of step S301 is NO, the routine is ended without carrying out any specific control. By contrast, if the zone where the fuel saving control is to be executed exists ahead on the traveling route so that the answer of step S301 is YES, the learned value saved while being associated with the zone ahead on the traveling route is read (at step S302).

Then, it is determined whether or not the learned value read at step S302 was learned during execution of the stop-based S & S control or the deceleration-based S & S control (at step S303). If at least the learned value during execution of any one of the stop-based S & S control and the deceleration-based S & S control is available, the answer of step S303 will be YES. In this case, it is determined whether or not the learned values of both cases or the available learned value of any of those cases indicate(s) a fact that the control(s) was/were not effective to save the fuel (at step S304). If the learned values during execution of both of the stop-based S & S control and the deceleration-based S & S control are available, and both of those values indicate a fact that the fuel consumption was increased during execution of the control, the answer of step S304 will be YES. Likewise, if the learned value during execution of any one of the stop-based S & S control and the deceleration-based S & S control is available, and the available learned value indicates a fact that the fuel consumption was increased during execution of the control, the answer of step S304 will also be YES. In those cases, none of the stop-based S & S control and the deceleration-based S & S control will be executed even when the vehicle reaches the above-mentioned zone to execute the fuel saving control (at step S305).

By contrast, if at least the learned value during execution of any one of the stop-based S & S control and the deceleration-based S & S control is available, and the available learned value does not indicates a fact that the fuel consumption was increased during execution of the control, the answer of step S304 will be NO. In this case, it is determined whether or not only the learned value of one of the controls indicates a fact that the fuel consumption was increased during execution of the control (at step S306). If the learned values during execution of both of the stop-based S & S control and the deceleration-based S & S control are available, and only the learned value of one of the controls indicates a fact that the fuel consumption was increased during execution of the control, the answer of step S306 will be YES. Likewise, if the learned value during execution of any one of the stop-based S & S control and the deceleration-based S & S control is available, and the available learned value does not indicate a fact that the fuel consumption was increased during execution of the control, the answer of step S306 will also be YES. In those cases, one of the stop-based S & S control and the deceleration-based S & S control that did not increase the fuel consumption, that is, only the control effective to save the fuel is permitted to be carried out (at step S307). By contrast, if the learned values during execution of both of the stop-based S & S control and the deceleration-based S & S control are available, and none of the learned values indicate a fact that the fuel consumption was increased during execution of the control, the answer of step S306 will be NO. In this case, both of the stop-based S & S control and the deceleration-based S & S control are permitted in the aforementioned zone upon satisfaction of the starting condition (at step S308).

Referring back to step S303, if none of the learned values during execution of the stop-based S & S control and the deceleration-based S & S control are available so that the answer of step S303 is NO, it is determined whether or not the learned value read at the above-explained step S302 was learned during execution of the N coasting control or the free-run S & S control (at step S309). If at least the learned value during execution of any one of the N coasting control and the free-run S & S control is available, the answer of step S309 will be YES. In this case, it is determined whether or not the learned values of both cases or the available learned value of any of those cases indicate(s) a fact that the control(s) was/were not effective to save the fuel (at step S310). If the learned values during execution of both of the N coasting control or the free-run S & S control are available, and both of those values indicate a fact that the fuel consumption was increased during execution of the control, the answer of step S310 will be YES. Likewise, if the learned value during execution of any one of the N coasting control or the free-run S & S control is available, and the available learned value indicates a fact that the fuel consumption was increased during execution of the control, the answer of step S310 will also be YES. In those cases, none of the N coasting control or the free-run S & S control will be executed even when the vehicle reaches the above-mentioned zone (at step S311).

By contrast, if at least the learned value during execution of any one of the N coasting control or the free-run S & S control is available, and the available learned value does not indicates a fact that the fuel consumption was increased during execution of the control, the answer of step S310 will be NO. In this case, it is determined whether or not only the learned value of one of the controls indicates a fact that the fuel consumption was increased during execution of the control (at step S312). If the learned values during execution of both of the N coasting control or the free-run S & S control are available, and only the learned value of one of the controls indicates a fact that the fuel consumption was increased during execution of the control, the answer of step S312 will be YES. Likewise, if the learned value during execution of any one of the N coasting control or the free-run S & S control is available, and the available learned value does not indicate a fact that the fuel consumption was increased during execution of the control, the answer of step S312 will also be YES. In those cases, one of the N coasting control or the free-run S & S control that did not increase the fuel consumption, that is, only the control effective to save the fuel is permitted to be carried out (at step S313). By contrast, if the learned values during execution of both of the N coasting control or the free-run S & S control are available, and none of the learned values indicate a fact that the fuel consumption was increased during execution of the control, the answer of step S312 will be NO. In this case, both of the N coasting control or the free-run S & S control are permitted in the aforementioned zone upon satisfaction of the starting condition (at step S314).

Referring back to step S309, if the answer of step S309 is NO, this means that none of the learned values during execution of the fuel saving controls were available at the above-explained step S302. In this case, the fuel saving control is selected from the stop-based S & S control, the deceleration-based S & S control, the N coasting control, and the free-run S & S control depending on the running condition and the road condition, and executed upon satisfaction of the starting control (at step S315). Then, the data about fuel saving effect of the executed control is updated in the aforementioned database.

Such selection of the fuel saving control may also be carried out based on the learned value showing strong effectiveness of the control to save the fuel, instead of the learned value showing an increase of fuel consumption. In addition, such selection of the fuel saving control may also be carried out based on the learned values obtained during execution of multiple times of the control or based on frequency of availability of the learned value, instead of the single learned value.

Second Selection Example of the Fuel Saving Control

As described, the clutch 2 is brought into disengagement to disconnect the engine 1 from the powertrain during execution of the N coasting control and the free-run S & S control, and hence the engine braking force will not be applied to the vehicle. Therefore, the N coasting control and the free-run S & S control would be inhibited when the vehicle runs on a downslope where a strong braking force is required. However, if a downgrade is not so steep so that the vehicle can travel safely on the downslope without requiring a strong braking force, it is not necessary to inhibit those controls. According to the preferred example, the learned value obtained during running can be used not only during the upcoming travel but also on a real-time basis.

An example of such control of permitting (or inhibiting) the N coasting control and the free-run S & S control depending on the running conditions will be explained with reference to FIG. 21. A permitting condition of those controls is determined during a design phase, and at step S321, it is determined whether or not the permitting condition of the control is satisfied. If the permitting condition of the control is satisfied so that the answer of step S321 is YES, the N coasting control or the free-run S & S control is permitted at step S322, and executed at step S323.

Since the N coasting control or the free-run S & S control is carried out to effectively utilize an inertial energy of the running vehicle, a braking force will not be applied to the vehicle during execution of the control. That is, when the vehicle runs on a downslope during execution of those controls, a vehicle speed would be increased automatically. Therefore, at step S324, it is determined whether or not the vehicle speed is increased to be higher than a predetermined reference speed. Specifically, the reference speed may be set to the highest speed in the past or to a legal speed at the current position of the vehicle. If the current vehicle speed is not higher than the reference speed so that the answer of step S324 is NO, the routine is returned to step S323 to continue the N coasting control or the free-run S & S control.

By contrast, if the current vehicle speed is higher than the reference speed so that the answer of step S324 is YES, the N coasting control or the free-run S & S control is terminated to prevent an excessive increase of the vehicle speed (at step S325). In this case, the database may be updated in a manner such that the N coasting control or the free-run S & S control will be inhibited next opportunity to pass through the same zone.

Figure 21:
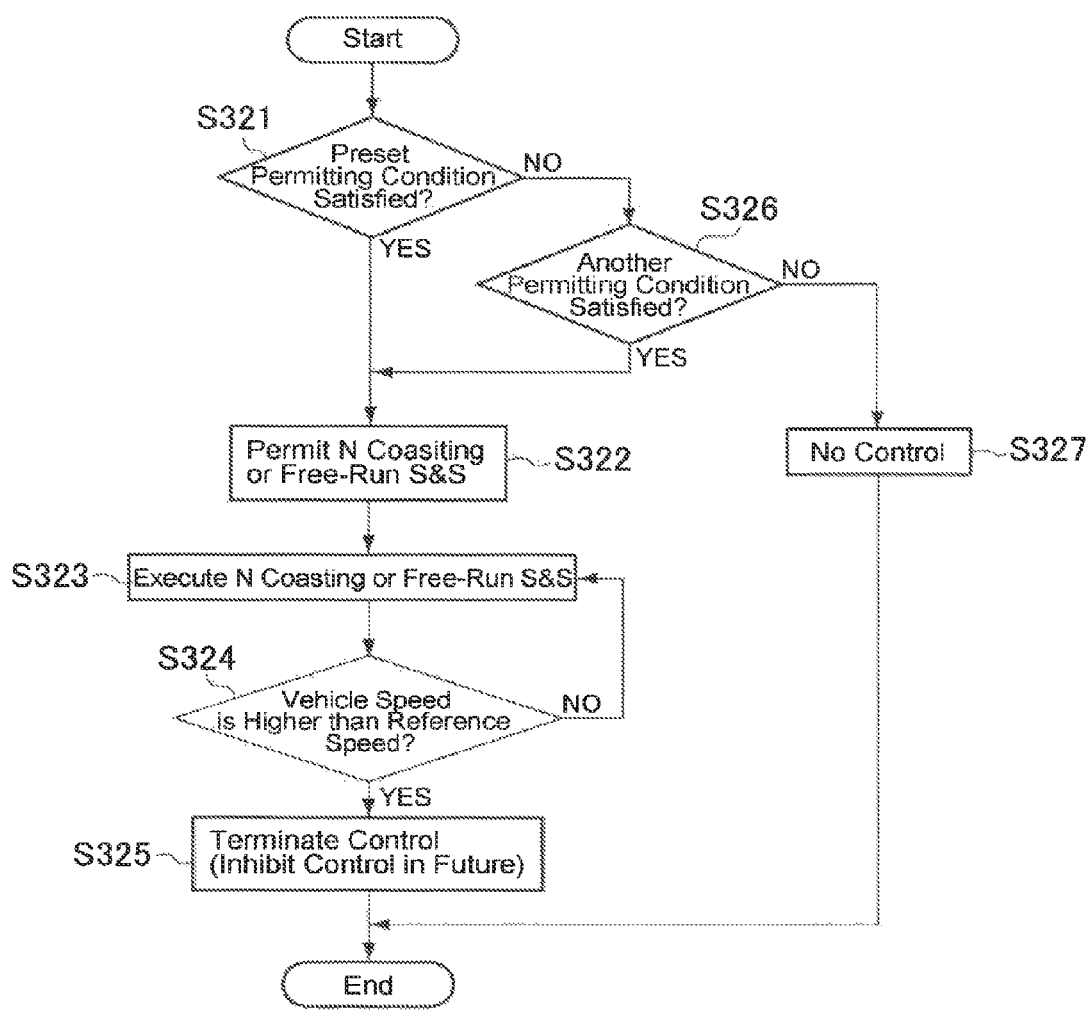
FIG. 21 is a flowchart showing an example of determining a satisfaction of an alternative condition to permit the N coasting control or the free-run S & S control that is executed when conditions to permit those controls are not satisfied.

That is, according to the example shown in FIG. 21, the normal controls are carried out from step S321 to step S325. In addition, if the permitting condition of the control is not satisfied so that the answer of step S321 is NO, it is determined whether or not another permitting condition concerning a road condition is satisfied (at step S326). Specifically, it is determined whether or not a possibility to require a braking force is low. For example, if a road width is wide enough so that an acceptable speed is relatively high, and if an upslope steeper than a predetermined gradient approaches within a predetermined distance, the answer of step S326 will be YES. In this case, the routine advances to step S322 to permit and execute the N coasting control or the free-run S & S control. By contrast, if the aforementioned another permitting condition is not satisfied so that the answer of step S326 is NO, the N coasting control or the free-run S & S control is inhibited (at step S327).

Third Selection Example of the Fuel Saving Control

As described, the N coasting control and the free-run S & S control are executed by returning the accelerator pedal to stop generating a driving force under the conditions that the downgrade and the curvature of the road are smaller than the predetermined values. However, those fuel saving controls may be executed depending on a driving skill of the driver and actual road conditions, even in a zone where those predetermined permitting conditions are not satisfied. To this end, an execution of the above-mentioned controls is determined based on the below-explained another permitting condition.

Figure 22:
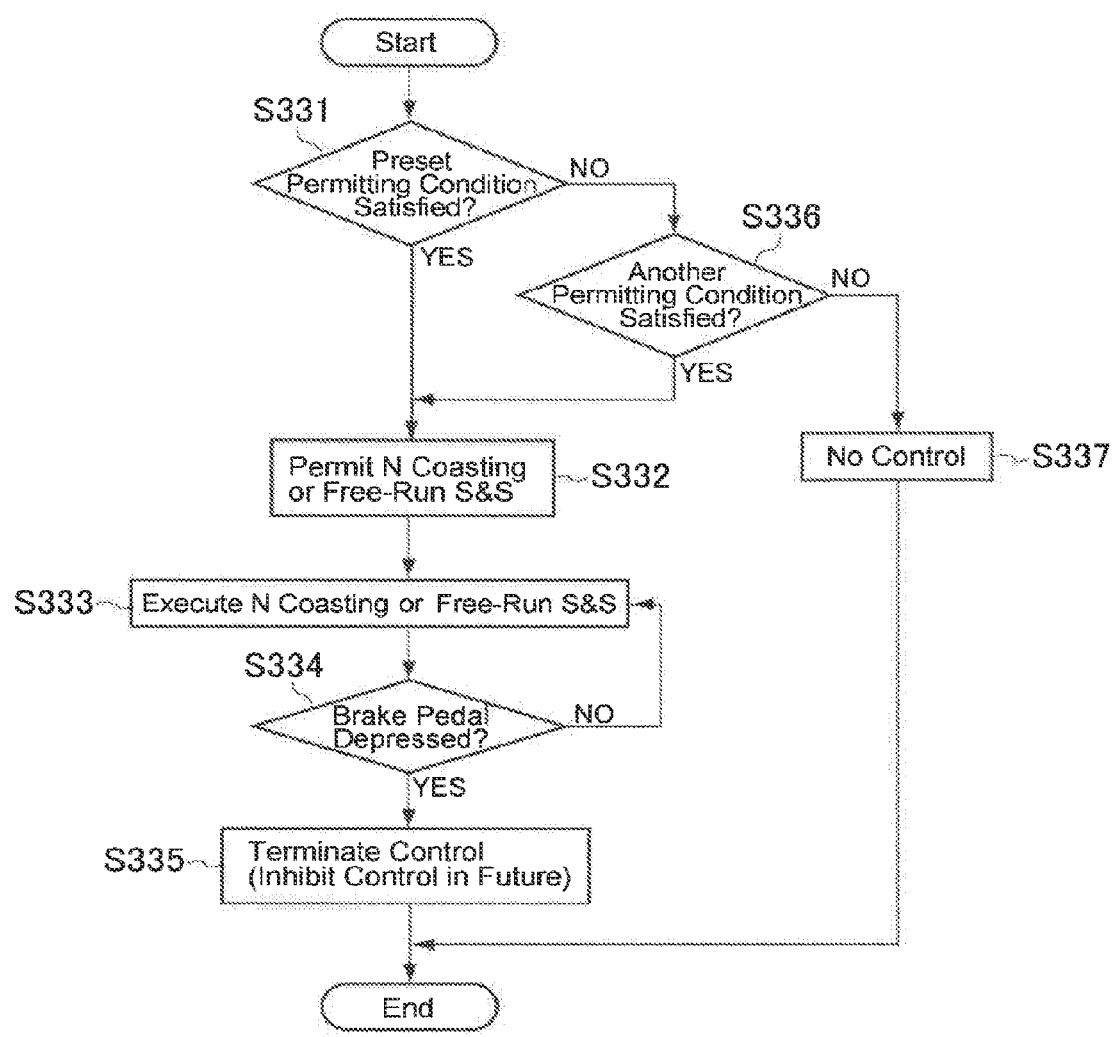
FIG. 22 is a flowchart showing another example of determining a satisfaction of an alternative condition to permit the N coasting control or the free-run S & S control that is executed when conditions to permit those controls are not satisfied.

An example of permitting (or inhibiting) the N coasting control and the free-run S & S control depending on the actual running conditions will be explained with reference to FIG. 22. First of all, it is determined whether or not the permitting condition of the control determined during a design phase is satisfied (at step S331). If the permitting condition of the control is satisfied so that the answer of step S331 is YES, the N coasting control or the free-run S & S control is permitted at step S332, and executed at step S333.

As described, the N coasting control or the free-run S & S control is carried out to effectively utilize an inertial energy of the running vehicle. Therefore, then it is determined whether or not the brake pedal is depressed (at step S334). If a braking force is not required so that the answer of step S334 is NO, the routine is returned to step S333 to continue the N coasting control or the free-run S & S control. By contrast, if the brake pedal is depressed so that the answer of step S334 is YES, the N coasting control or the free-run S & S control is terminated as a result of generation of the braking force (at step S335). In this case, the database may be updated in a manner such that the N coasting control or the free-run S & S control will be inhibited next opportunity to pass through the same zone.

Thus, the normal controls are also carried out from step S331 to step S335. According to the example shown in FIG. 22, if the permitting condition of the control is not satisfied so that the answer of step S331 is NO, it is determined whether or not another permitting condition concerning the actual road condition is satisfied (at step S336). Specifically, it is determined whether or not the driver has a record of a travelling through the zone where the predetermined permitting conditions are not satisfied without depressing the brake pedal to generate a braking force. If the answer of step S336 is YES, the routine advances to step S332 to permit and execute the N coasting control or the free-run S & S control. By contrast, if the aforementioned another permitting condition is not satisfied so that the answer of step S336 is NO, the N coasting control or the free-run S & S control is inhibited (at step S337).

Example of Control Selection by the Driver

In the vehicle to which the control system of the present invention is applied, a driving force is generated by depressing the accelerator pedal, and a braking force is generated by depressing the brake pedal. That is, the driver manipulates the vehicle by operating those pedals in accordance with his/her intention. On the other hand, the control system is configured to carry out the fuel saving controls such as the N coasting control or the free-run S & S control and the stop-based S & S control and the deceleration-based S & S control by automatically stopping the engine 1 while disconnecting from the powertrain including the transmission 3. In the vehicle thus structured, therefore, a braking condition of the vehicle may not always be controlled in line with the driver's intention. In other words, the vehicle may not be controlled in line with the driver's intention and the driver may feel an uncomfortable feeling. In order to avoid such disadvantages, a switch for inhibiting (or executing) the fuel saving control by a manual operation may be arranged in the vehicle. In this case, an operation record of the switch is saved in the form of the learned value to operate the vehicle in line with the driver's intention.

Figure 23:
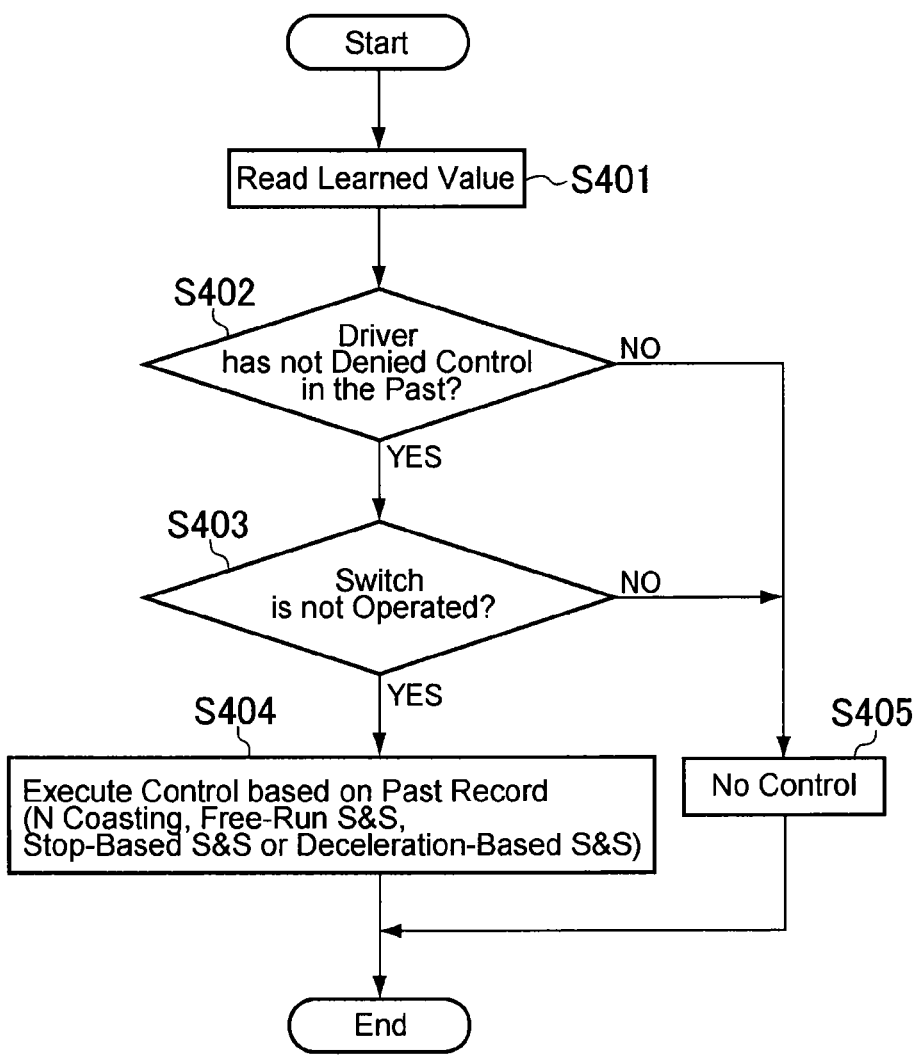
FIG. 23 is a flowchart showing an example of executing the fuel saving control based on a driver's switch operation.

The control example of this case is shown in FIG. 23. First of all, when the vehicle comes close to the zone where the fuel saving control is to be executed (i.e., the aforementioned learning zone), the learned value is read (at step S401). Specifically, the learned value representing the operation record of the switch is read out. Then, at step S402, it is determined whether or not the learned value indicates a fact that the fuel saving control has not been inhibited by operating the switch in the zone concerned, that is, it is determined whether or not the driver has not denied to execute the fuel saving control in the past within the zone concerned. If the driver has not inhibited to execute the fuel saving control by manually operating the switch in the zone concerned so that the answer of step S402 is YES, then it is determined whether or not the switch is currently being operated (at step S403). If the switch is currently not operated so the answer of step S403 is YES, the condition to execute the fuel saving control is satisfied. In this case, therefore, the fuel saving control to be executed is selected with reference the past record in the learning zone concerned (at step S404).

By contrast, if the driver has inhibited to execute the fuel saving control by manually operating the switch in the zone concerned so that the answer of step S402 is NO, or if the switch is currently operated so the answer of step S403 is NO, none of the fuel saving control is executed (at step S405). Optionally, the inhibiting switch may be adapted to inhibit only a selected fuel saving control. In this case, only the selected fuel saving control is inhibited at step S405.

Thus, according to the foregoing preferred examples, the vehicle control system makes an assessment of fuel saving effect of the control learned during an actual running, and selects the fuel saving control to be executed or inhibits the fuel saving control based on the assessment next time the vehicle travels through the corresponding zone. Therefore, the fuel saving controls can be carried out appropriately to save the fuel in line with the driver's preference and depending on an actual running condition such as a gradient and a curvature of a road.

REFERENCE SIGNS LIST

1: engine (E/G); 2: clutch; 3: transmission (T/M); 4: drive wheel; 5: electronic control unit (ECU); 6: steering device 7: running environment detecting device.

The invention claimed is:

1. A vehicle control system comprising:
an electronic control unit (ECU) configured to:
make an assessment of a fuel saving control by learning fuel consumption within a predetermined learning zone including a zone where the fuel saving control is executed; and
determine whether or not to execute the fuel saving control based on a result of the assessment.

2. The vehicle control system as claimed in claim 1, wherein the ECU further configured to save the learned fuel consumption in association with the learning zone.

3. The vehicle control system as claimed in claim 1, wherein a curvature of the learning zone is smaller than a predetermined value and a length of the learning zone is longer than a predetermined distance.

4. The vehicle control system as claimed in claim 1, further comprising:
an internal combustion engine adapted to increase an output power according to an opening degree of an accelerator,
wherein the learning zone includes a zone beginning from a point at which the opening degree of the accelerator is reduced and ending at a point at which the opening degree is reduced again after being increased.

5. The vehicle control system as claimed in claim 1, further comprising:
an internal combustion engine adapted to increase an output power according to an opening degree of an accelerator; and
wherein the learning zone includes a zone beginning from a point at which the opening degree of the accelerator is reduced and ending at a point at which the opening degree is increased.

6. The vehicle control system as claimed in claim 1, wherein the ECU is further configured to:
compare the fuel consumption obtained during execution of the fuel saving control to a fuel consumption obtained without executing the fuel saving control in the same learning zone; and
learn an increase of the fuel consumption in the learning zone based on a larger fuel consumption.

7. The vehicle control system as claimed in claim 1, wherein the fuel saving control includes a plurality of fuel saving controls executed based upon different execution conditions; and
wherein the ECU is further configured to:
compare an actual fuel consumption obtained during an actual running of the vehicle under one of the fuel saving controls to a fuel consumption obtained from a simulation based on an actual running under another of the fuel saving controls; and
learn an increase of fuel consumption during the actual running if the actual fuel consumption is larger than the fuel consumption obtained from the simulation.

8. The vehicle control system as claimed in claim 1, wherein when a plurality of learned fuel consumptions are stored, the ECU is further configured to select a fuel saving control that was effective to save fuel based upon the plurality of learned fuel consumptions when the vehicle travels through the learning zone.

9. The vehicle control system as claimed in claim 1, wherein the fuel saving control includes a plurality of fuel saving controls comprising:
a neutral coasting control in which an engine is disconnected from a powertrain when the engine is not required to generate power during running:
a free-run stop and start control in which the engine is disconnected from a powertrain while stopping fuel supply thereto when the engine is not required to generate power during running;
a deceleration-based stop and start control in which the engine is disconnected from a powertrain while stopping fuel supply thereto when an engine braking force is not required during decelerating the vehicle; and
a stop-based stop and start control in which fuel supply to the engine is stopped when the vehicle is stopped.

* * * * *